United States Patent
Demsey et al.

(10) Patent No.: US 11,716,375 B2
(45) Date of Patent: Aug. 1, 2023

(54) SYSTEM, DEVICES AND METHODS FOR IDENTIFYING MOBILE DEVICES AND OTHER COMPUTER DEVICES

(71) Applicant: NextRoll, Inc., San Francisco, CA (US)

(72) Inventors: Seth Demsey, Vienna, VA (US); Oleksiy Stolitniy, New York, NY (US)

(73) Assignee: NextRoll, Inc., San Francisco, CA (US)

( * ) Notice: Subject to any disclaimer, the term of this patent is extended or adjusted under 35 U.S.C. 154(b) by 0 days.

(21) Appl. No.: 16/198,943

(22) Filed: Nov. 23, 2018

(65) Prior Publication Data
US 2019/0199774 A1  Jun. 27, 2019

Related U.S. Application Data

(60) Provisional application No. 62/590,078, filed on Nov. 22, 2017.

(51) Int. Cl.
| | |
|---|---|
| H04L 29/08 | (2006.01) |
| G06Q 30/02 | (2023.01) |
| H04L 67/04 | (2022.01) |
| G06Q 30/0251 | (2023.01) |
| H04L 67/02 | (2022.01) |
| H04L 67/50 | (2022.01) |

(52) U.S. Cl.
CPC ......... *H04L 67/04* (2013.01); *G06Q 30/0267* (2013.01); *H04L 67/02* (2013.01); *H04L 67/535* (2022.05)

(58) Field of Classification Search
CPC ...... H04L 67/04; H04L 67/02; G06Q 30/0267
USPC .......................................................... 455/414
See application file for complete search history.

(56) References Cited

U.S. PATENT DOCUMENTS

| | | |
|---|---|---|
| 8,438,184 B1 | 5/2013 | Wang et al. |
| 9,319,379 B1 | 4/2016 | Burcham et al. |
| 9,756,020 B2 * | 9/2017 | Kaufman ............... H04L 63/08 |
| 10,091,312 B1 | 10/2018 | Khanwalkar et al. |
| 10,223,458 B1 * | 3/2019 | Decker ............... G06F 16/9535 |
| 10,453,092 B1 * | 10/2019 | Wang ................. G06Q 30/0275 |
| 2003/0070067 A1 | 4/2003 | Saito |
| 2004/0133675 A1 * | 7/2004 | Ishiyama ............ H04L 61/4511 709/224 |
| 2006/0100928 A1 * | 5/2006 | Walczak ............ G06Q 30/0267 705/14.64 |
| 2006/0112176 A1 * | 5/2006 | Liu ........................ H04L 67/101 709/245 |
| 2008/0304482 A1 | 12/2008 | Grassi et al. |
| 2011/0289185 A1 | 11/2011 | Heder et al. |
| 2011/0321167 A1 | 12/2011 | Wu et al. |
| 2012/0113959 A1 | 5/2012 | Sugizaki et al. |

(Continued)

*Primary Examiner* — Charles N Appiah
*Assistant Examiner* — Nicole M Louis-Fils
(74) *Attorney, Agent, or Firm* — Muir Patent Law, PLLC

(57) ABSTRACT

Improved identification of a computer configured with an operating system (OS), a web browser and one or more applications is disclosed. An identifying code for advertisers (IFA) may be obtained via the operating system (OS) of the computer. A first application configuring the computer may include instructions to initiate an ad call comprising a request including the IFA to cause the first application to render an advertisement received by the computing device from a first web resource in response to the ad call. The web browser may execute the script to associate the web browser with a durable id (DID). The DID and the IFA may be correlated.

37 Claims, 19 Drawing Sheets

(56) References Cited

U.S. PATENT DOCUMENTS

| | | |
|---|---|---|
| 2012/0265599 A1 | 10/2012 | Corner et al. |
| 2013/0124309 A1 | 5/2013 | Traasdahl et al. |
| 2013/0238425 A1 | 9/2013 | Saldanha et al. |
| 2013/0273879 A1 | 10/2013 | Eisen et al. |
| 2013/0275570 A1 | 10/2013 | Treuhaft et al. |
| 2013/0304604 A1* | 11/2013 | Hoffman ............ G06Q 30/0621 705/26.5 |
| 2014/0207566 A1 | 7/2014 | Kamran et al. |
| 2015/0095957 A1 | 4/2015 | Ravi |
| 2015/0334158 A1 | 11/2015 | Ravi |
| 2015/0334172 A1 | 11/2015 | Ravi |
| 2016/0036943 A1 | 2/2016 | Kish et al. |
| 2016/0050167 A1 | 2/2016 | Ramachandran |
| 2016/0269497 A1* | 9/2016 | Glommen ............. H04L 67/306 |
| 2016/0364498 A1* | 12/2016 | Greene ................ G06F 16/955 |
| 2016/0381161 A1 | 12/2016 | Matsumura |
| 2017/0064032 A1* | 3/2017 | Ulrich .................... H04L 67/02 |
| 2017/0085412 A1 | 3/2017 | Greene |
| 2017/0085522 A1 | 3/2017 | Greene |
| 2017/0093759 A1* | 3/2017 | Wistow ................ H04L 67/561 |
| 2018/0025086 A1 | 1/2018 | Malkin et al. |
| 2018/0048564 A1 | 2/2018 | Bianco et al. |
| 2018/0241716 A1 | 8/2018 | Roberts |
| 2018/0375953 A1* | 12/2018 | Casassa Mont .... H04L 61/2015 |
| 2019/0007412 A1* | 1/2019 | Ram ................... H04L 63/0876 |

* cited by examiner

154a

| Vendor ID | Ad ID | Date | Time | Device IFA | Device DID |
|---|---|---|---|---|---|
| 1234 | 55A5 | 06-08-2016 | 7:32 PM | 9876 | 7654 |
| 1234 | 55A5 | 06-11-2016 | 12:05 PM | 1212 | 0324 |
| 1234 | 4590 | 06-18-2016 | 5:45 PM | 9876 | 7654 |
| F2D7 | 2C98 | 06-06-2016 | 7:01 AM | 44FE | 0042 |
| 1D08 | 55A5 | 06-30-2016 | 11:03 PM | | AB99 |
| ... | ... | ... | ... | ... | ... |

| Device IFA | Device DID | Opt-out flag |
|---|---|---|
| 9876 | 7654 | 0 |
| 1212 | 0324 | 0 |
| 7D7D | 0000 | 1 |
| 44FE | 0042 | 0 |
| 2323 | 0000 | 1 |
| | AB99 | 0 |
| ... | ... | ... |

| Vendor ID | Ad ID | Date | Time | Device IFA | Device DID-a | Device DID-b | DNSID |
|---|---|---|---|---|---|---|---|
| 1234 | 55A5 | 06-08-2016 | 7:32 PM | 9876 | 7654 | | 8888 |
| 1234 | 55A5 | 06-11-2016 | 12:05 PM | 1212 | 0324 | | 9333 |
| 1234 | 4590 | 06-18-2016 | 5:45 PM | 9876 | 7654 | | 8888 |
| F2D7 | 2C98 | 06-06-2016 | 7:01 AM | 44FE | 0042 | DF12 | 4400 |
| 1D08 | 55A5 | 06-30-2016 | 11:03 PM | | AB99 | | 3232 |
| ... | ... | | ... | ... | | | |

144a'

| Device IFA | Device DID-a | Device DID-b | DNSID | Opt-out flag |
|---|---|---|---|---|
| 9876 | 7654 |  | 8888 | 0 |
| 1212 | 0324 |  | 9333 | 0 |
| 7D7D | 0000 |  | 0000 | 1 |
| 44FE | 0042 | DF12 | 4400 | 0 |
| 2323 | 0000 | 0000 | 0000 | 1 |
|  | AB99 |  | 3232 | 0 |
|  | 7523 | B861 | 0682 |  |
| 8372 | D4BC | D4BC | 1982 | 0 |
| ... | ... |  |  | ... |

FIG. 2F

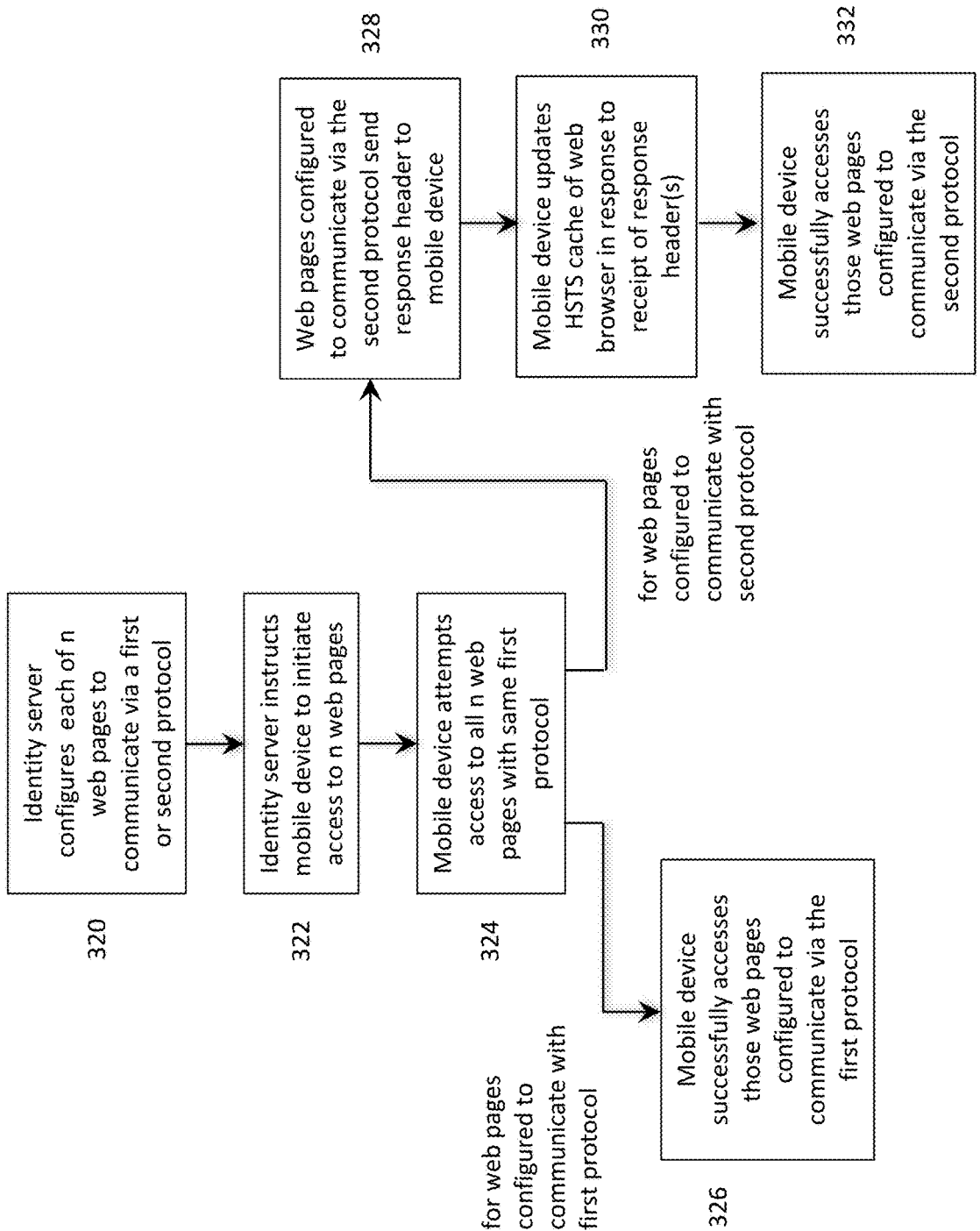

FIG. 3D

| bit # | DID bit | Initial HTTP protocol and web page | HSTS? | Change protocol to HTTPS? |
|---|---|---|---|---|
| 0 | 1 | http://www.b0.identify.com/img.jpg | Y | Y => https://www.b0.identify.com/img.jpg |
| 1 | 0 | http://www.b1.identify.com/img.jpg | N | No |
| 2 | 1 | http://www.b2.identify.com/img.jpg | Y | Y => https://www.b2.identify.com/img.jpg |
| 3 | 0 | http://www.b3.identify.com/img.jpg | N | No |
| ... | ... | ... | ... | ... |
| 15 | 0 | http://www.b15.identify.com/img.jpg DID code = 0x0325 | Y | Y => https://www.b15.identify.com/img.jpg |

FIG. 8D

| "bitgroup32" | "bitgroup31" | | "bitgroup3" | "bitgroup2" | "bitgroup1" |
|---|---|---|---|---|---|
| 800-32 | 800-31 | ..... | 800-3 | 800-2 | 800-1 |

| "bitgroup32" | "bitgroup31" | | "bitgroup3" | "bitgroup2" | "bitgroup1" |
|---|---|---|---|---|---|
| B | C | ..... | A | A | D |

| "bitgroup32" | "bitgroup31" | | "bitgroup3" | "bitgroup2" | "bitgroup1" |
|---|---|---|---|---|---|
| 01 | 10 | ..... | 00 | 00 | 11 |

800

SYSTEM, DEVICES AND METHODS FOR IDENTIFYING MOBILE DEVICES AND OTHER COMPUTER DEVICES

RELATED APPLICATIONS

This application is a non-provisional application of U.S. Provisional Application No. 62/590,078 filed Nov. 22, 2017, the contents of which are hereby incorporated by reference in its entirety.

BACKGROUND

The present disclosure is directed toward a system and method of identifying mobile devices, such as cell phones, and other computer devices that communicate over a network.

SUMMARY

Methods, computers, networks and computer readable media are disclosed herein for providing improved identification of a computing device. In some examples, a computer may be configured with an operating system (OS), a web browser and one or more applications. An identifying code for advertisers (IFA) may be obtained via the operating system (OS). A first application configuring the computer may include instructions to initiate an ad call comprising a request including the IFA to cause the first application to render an advertisement received by the computing device from a first web resource in response to the ad call. The web browser may execute the script to associate the web browser with a durable id (DID).

The script may be obtained via the web browser accessing a second web resource or may be provided as part of the first application.

The script may cause the web browser to access a series of web resources which may cause the web browser to be associated with the DID.

The web browser application may be unable to obtain the IFA via requests to the OS or otherwise access to the IFA as stored by the OS within the computer.

The computer may be a mobile device, and communications with the first web resource and the second web resource by the computer may include wireless communications using a radio of the mobile device.

BRIEF DESCRIPTION OF THE DRAWINGS

Further details and features of the invention may be appreciated by reference to the disclosed exemplary embodiments of the invention set forth in the following detailed description and the accompanying drawings in which:

FIG. 2B illustrates an exemplary ad tracking table and FIG. 2C illustrates an exemplary look-up table, FIGS. 2E and 2F illustrate examples an ad tracking table;

FIGS. 3A, 3B, 3C, 3E, 3F, 4A and 4B illustrate exemplary details that may be performed as part of the method of FIGS. 2A/2D, FIG. 3D illustrates the association of bits of an exemplary identification code with HTTP protocols;

FIGS. 8D, 8E, 8F illustrates details in connection with an exemplary DNSID code format.

DETAILED DESCRIPTION

Figure 1:
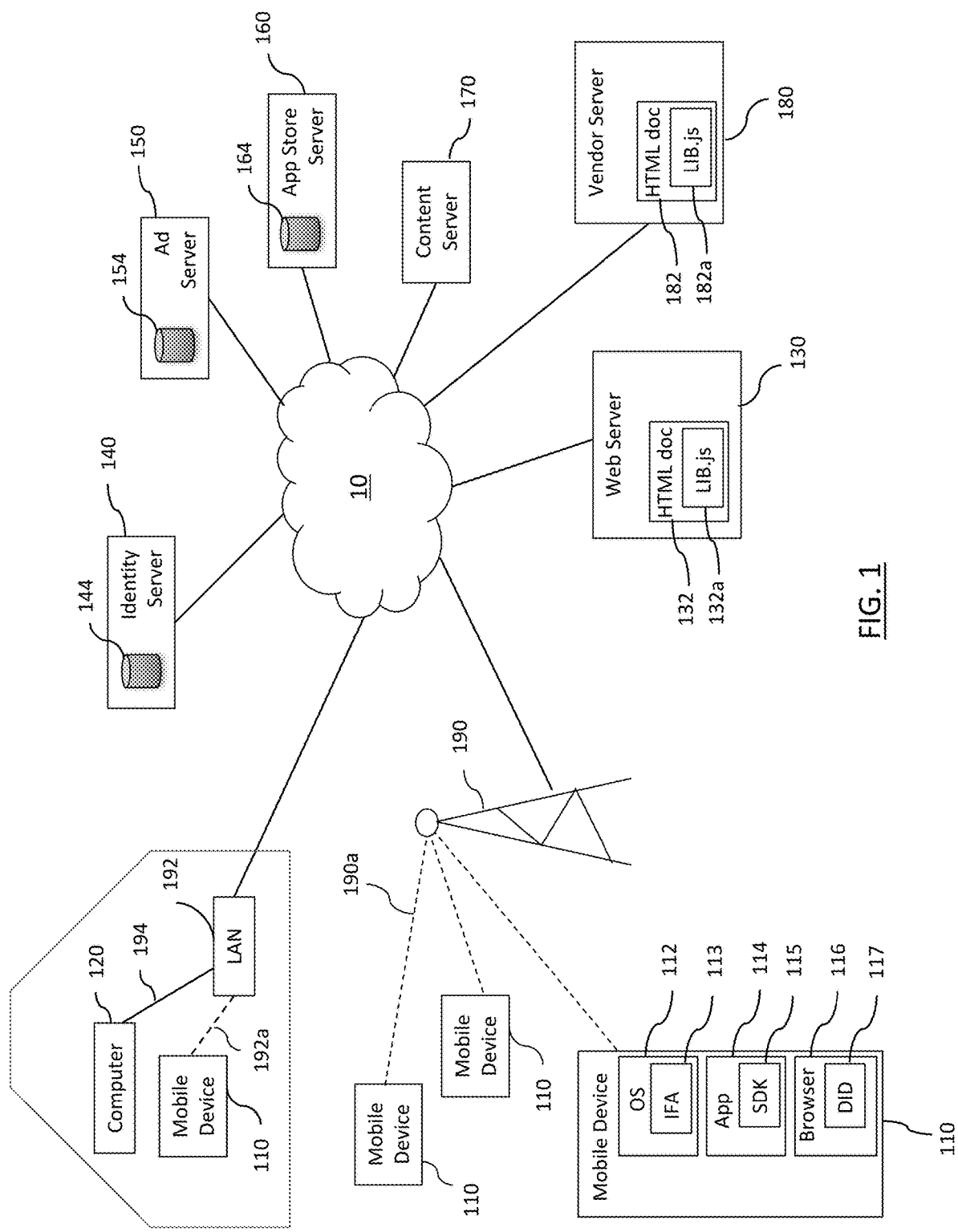
FIG. 1 depicts a system for implementing identification of a mobile device and other computer devices.

The present disclosure will now be described more fully with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

The terminology used herein is for the purpose of describing particular embodiments only and is not intended to limit the scope of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

Ordinal numbers such as "first," "second," "third," etc. may be used simply as labels of certain elements, steps, etc., to distinguish such elements, steps, etc. from one another. Terms that are not described using "first," "second," etc., in the specification, may still be referred to as "first" or "second" in a claim. In addition, a term that is referenced with a particular ordinal number (e.g., "first" in a particular claim) may be described elsewhere with a different ordinal number (e.g., "second" in the specification or another claim).

It will be further understood that all transitional terms (e.g., "comprises," "includes," "having," etc.) except "consisting of" and "essentially consisting of" are open ended and allow for the presence of additional structure or steps.

The computer may comprise a processor (e.g., a microprocessor, a controller, a CPU, a GPU, etc.) or several processors configured by software. A "computer" may be one or more apparatuses and/or one or more systems that are capable of accepting a structured input, processing the structured input according to prescribed rules, and producing results of the processing as output. Examples of a computer include: a stationary and/or portable computer; a mobile device such as a cell phone; a computer having a single processor, multiple processors, or multi-core processors; a general purpose computer; a supercomputer; a mainframe; a workstation; a micro-computer; a server; a client; a web appliance; a telecommunications device with internet access; a tablet; a personal digital assistant (PDA); application-specific hardware, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC). As is understood, "software" refers to prescribed rules to operate a computer. Examples of software may include: script, HTML code, micro-code; code segments; instructions; applets; pre-compiled code; compiled code; interpreted code; computer programs; and programmed logic.

A website refers to a one or more web resources, such as web pages, hosted by a web server typically associated with the same domain name. Reference herein to accessing a web resource, such as a web page, also indicates access to the website of the web resource. A web resource may be information obtained by a user device, such as by a web browser or other application of a user device, over a network (e.g., the Internet) and/or using TCP/IP, such as using HTTP, in this latter case, such a web resource may be referred to as an HTTP loaded resource or an HTTP resource. HTTP resources may be identified and located on a network (e.g., the Internet) by Uniform Resource Locators (URLs). HTTP (Hypertext Transfer Protocol) as used in this application includes both HTTPS as well as other less secure versions of HTTP, such as HTTP/1.1 and HTTP/1.0 (which may be referred to herein as unsecure HTTP to distinguish these protocols form HTTPS. HTTPS is a secure version of HTTP and is often referred to as HTTP Secure, HTTP over Transport Layer Security and HTTP over SSL.

A web page may be identified by a uniform resource locator (URL) (also referred to as a web address), such as http://www.example.com/filename.html, where "http" indicates a protocol, "www.example.com" is a hostname, and "filename.html" is a path portion of the URL providing a filename ("filename.html"). A hostname (e.g., www.example.com) may have an IP address assigned to it, where the IP address identifies a host computer and may be used to access the host computer over the Internet. Unless context indicates otherwise, an IP address is a public IP address, such as an IPv4 address or IPv6 address. The host computer may be a web server, e.g. The hostname is formed several labels separated by dots or periods ("."). It will be appreciated that "www.example.com" sets forth several domain names, including a top level domain ".com", the second level domain "example.com" as well as the domain name assigned to a host computer "www.example.com" (making this last domain name a hostname as well). A hostname may comprise a "host-specific" label and a domain name separated by a period ("."). In this example, the hostname www.example.com comprises the domain name "example.com" and the host-specific label "www". While a host-specific label of a hostname is sometimes referred to itself as a "hostname," such terminology is not adopted by this application (although "local hostname" would be appropriate). In this application, "hostname" includes any domain name that may be used to obtain an IP address, where such IP address fully identifies a particular host computer (e.g., sufficient to identify the host computer without further address information). Thus, "hostname" as used in this application does not refer to the host-specific label of a domain name (although a hostname may include host-specific label). It will be appreciated that while the domain name formed by all the labels in a URL between the double slashes "//" and the immediately following slash "/" will typically be a hostname (e.g., if it may be used to obtain an IP address to identify a host computer), it should also be appreciated that portions of this domain name (e.g., portions after the host-specific label immediately following the double slashes "//") may also form a hostname (e.g., "example.com" may also qualify as a hostname if it may be used to obtain an IP address assigned to it to identify a host computer). Depending on context, a web page may refer to a type of web resource, such as a particular document (e.g., HTML document) of the website, that may be accessed over the Internet, or a web page may refer to the rendering of a web browser in response to such a document (e.g., the rendering of an HTML document). Rendering of a web page by a web browser refers to the particular configuration of a user interface, such as images displayed and music played by a computer, caused by a web browser application in response to accessing a particular document (e.g., an HTML document). It should be appreciated that when "web page" refers to a document (e.g., an HTML document), access of such a document need not result in any rendering (e.g., display) by an accessing browser. Thus, a web browser access may comprise accessing resources from a host computer over the Internet without any rendering by the web browser in response to such access. Reference herein to "web resource" and accesses to such a web resource may be used to emphasize that web accesses by a web browser need not result in a rendering by the web browser in response to such an access (although access of a "web resource" may result in rendering by a web browser). For example, a web browser may access over the Internet a web resource hosted by a web site simply to obtain and execute script (e.g., JavaScript) from the host computer, where such access and execution does not result in any rendering by the web browser.

An ad server refers to one or more servers which obtain an ad that is provided to a web browser. Depending on context, an ad call may refer to the actions of these one or more servers (comprising the ad server) and the web browser to obtain the ad, or may refer to the initial request by the web browser that initiates obtaining the ad.

FIG. 1 depicts a system for implementing identification of a mobile device and other computer devices according to certain embodiments. A method and system for identifying a mobile device 110 may be implemented on a network 10, such as the Internet. A plurality of devices may be connected to and through the network 10, such as mobile devices 110, a computer 120, which may be a personal computer, such as a desktop computer or a laptop, and a plurality of servers 130, 140, 150, 160, 170 and 180.

Each mobile device 110 may be a smart phone comprising a cell phone that performs the functions of a computer and comprise a touch screen (not shown) as a user interface, providing internet access via a web browser application 116 and configured to download from the network 10 other applications 114. The mobile device 110 may have a mobile operating system (OS) 112, such as iOS™, Android™, Windows Mobile™ BlackBerry™ OS or WebOS™ (or Open WebOS™). The mobile OS 112 may comprise software configuring the computer hardware of the mobile device 110 (e.g., one or more processors and memory, such as DRAM and/or NAND flash memory) to run various functions of the mobile device 110, such as controlling interaction of the user interface, operation of the cell phone radio to provide wireless cell phone communications with cell phone network 190, operation of a various hardware of the smart phone mobile device, such as a camera and an associated image processor, a GPS (global positioning system) chipset, an accelerometer (e.g., a micro-electromechanical (MEMs) chip), a heart rate monitor and a fingerprint scanner, for example. The mobile OS 112 may also be responsible for the installation and operation of various applications of the mobile device 110, such as web browser application 116 and other applications 114 that may be previously installed on the mobile device 110 (e.g., an e-mail application) or may be an application downloaded via network 10. The mobile device may be Apple's™ iPhone™ Samsung's™ Galaxy™ Huwei's™ Mate S™, and the mobile operating system (OS) 112 may be iOS™, Android™, Windows Mobile™ BlackBerry™ OS, WebOS™ (or Open WebOS™), Firefox OS™ or Sailfish OS™.

The mobile device 110 may be connected to the network 10 (and other devices connected to the network 10) in a conventional manner, such via a wireless cell phone network 190 or via a wireless local area network (LAN) 192, such as via a WIFI connection (e.g., 192a). The cell phone network 190 may be a conventional, such as, e.g., GSM, or CDMA, including 3G and 4G wireless connections such as UMTS, CDMA2000, Mobile WiMAX (IEEE 806.16(e) or IEEE 806.16(m)), LTE, etc., and may comprise future cell phone technologies (e.g., 5G). The wireless connection 190a of a mobile device 110 to a cell phone network 190 may comprise radio frequency signals 190a to and from the mobile device 110 and one or more base stations (e.g., transceivers mounted on cell towers) of the cell phone network 190. The mobile device 110 may include a two-way radio to communicate with the base station of the cell phone network 190, and have a range over several kilometers (over 6 km, over 25 km, etc.) As the mobile device 110 moves between neighboring cells of the cell phone network 190, the mobile device 110 may reconfigure its communication link to hand-off communications from the current base station and to initiate communications with the new base station. The cell phone network 190 may provide communications between the mobile device 110 and the network 10 via conventional structure, such as via fiberoptic cables to sever of an Internet service provider (ISP).

The mobile device 110 may also be connected to network 10 such as through wireless local area network 192 (acting as an access point to the network 10) via a wireless connection 192a. The wireless connection 192a of the wireless local area network 192 may be a WIFI connection (e.g., IEEE 802.11 (b), (g), (n) or (ac)). The mobile device may also be connected to network 10 via a wide area network (WAN) (not shown), via a metropolitan area network (MAN) (not shown), etc.

Computer 120 may be a personal computer, such as a laptop or a desktop, and is connected to network 10 in the example of FIG. 1 via a wired connection 194 through LAN 192, although a wireless connection (e.g., 192a) via LAN is also contemplated. Computer 120 may also comprise an operating system 112, one or more applications 114 and a web browser application 116, although these may differ from those of mobile devices 110, just as these may differ from one mobile device 110 to another mobile device 110. Only one computer 120 is shown in FIG. 1 for ease of explanation, but it will be understood that a plurality of such computers 120 may be connected in various ways to network 10. Reference to computer in the singular form hereinafter will be understood to be equally applicable to other like computers.

As explained in further detail below, mobile devices 110 and computer 120 may be operably connected to one or more servers 130, 140, 150, 160, 170 and 180 through network 10, such as via TCP/IP (Transmission Control Protocol/Internet Protocol). The servers 130, 140, 150, 160, 170 and 180 are exemplary, and represent different server uses with respect to the disclosed embodiments. Although only one of each type of server is illustrated and referenced herein, this is for purposes of ease of discussion. It will be recognized that a plurality of each type of server 130, 140, 150, 160, 170 and 180 may be provided. Further, it should be appreciated that each server need not perform or be configured to perform all of the possible interactions and processes described herein. Thus, e.g., one vendor server 180 may provide a website through which purchase may be made, while another vendor server 180 may be responsible for providing applications 114 that are downloaded on mobile devices 110 and computers 120 and tracking the running of such applications 114 (although such description herein may refer to the "vendor server 180" in the singular in describing such actions). In addition, a single server may perform the roles described with respect to the different server types referenced herein.

Web server 130 is a server that hosts one or more websites that may be accessed by computer 120 and mobile devices 110. The web server may be a computer or a plurality of interconnected computers (such as plural servers connected over network 10). The web server 130 may be configured to store, process and deliver web pages of a website or other web resources of a web site to a client, which may comprise one of the mobile devices 110 and the computer 120. Specifically, in response to a request received over the network 10 from the web browser 116 (or other user agent) of one of the mobile devices 110 or computer 120, the web server 130 may provide web pages 132 and other information to the requesting device. The web pages 132 are typically formatted as HTML (Hyper Text Markup Language) documents which include images and other HTML constructs which the web browser 116 interprets to provide the web page 132 to the user, such as displaying the images and text of the HTML document, as well as reacting to user inputs (e.g., mouse clicks) with respect to the displayed web page. The web pages 132 may include embedded programs 132a, such as JavaScript™ that cause the web browser application 116 to perform various processes defined by the embedded program 132a. Communication between the web server 130 and the web browser 116 (of either mobile device 110 or computer 120) may take place using HTTP (Hypertext Transfer Protocol), including a relatively unsecure version of HTTP (e.g., HTTP/1.0 or HTTP/1.1) or HTTPS (often referred to as HTTP Secure, HTTP over Transport Layer Security and HTTP over SSL).

Other servers may communicate with between the web browser 116 of a user's mobile device 110 or computer 120, as described herein with respect to web server 130. For example, content server 170 may store a variety of content, such as a user's e-mail, text documents, reports, spreadsheets, presentations, music, photographs and other images, video, etc., which may be accessible by the user via communication with the content server 170 via web browser 116. Ad server 150 may provide advertisements (ad) to a user of the web browser 116. For example, web page 132 may include an HTML inline frame tag (or "iframe" tag) to embed another HTML document within the web page 132 (e.g., "<iframe>src="http://www.adverstisementtobedisplayedinwebpage132.com"></iframe> where src specifies the URL (uniform resource locator) address of the document to embed in web page 132. An aside tag may also be used to provide a section of the web page 132 that is set aside to display an ad. Other mechanisms may also be used to embed an ad into web page 132 as it is delivered to mobile device 100. The ad may be may be a still image or video and include a URL link that opens a web page of the advertiser upon receiving an appropriate input (e.g., mouse click on the displayed ad) by the user of the web browser 116.

The ad may be provided to the web browser 116 by ad server 150 in response to an ad tag (HTML code) provided as part of the web page 132 received by the browser 116. It should be appreciated that "ad server" as used herein refers to one or more servers with which the web browser 116 may communicate or otherwise may be used in the process of obtaining an ad to be rendered by the web browser 116 in response to an ad call initiated by the web browser 116. For example, the web browser 116 may initiate an ad call (requesting an ad be delivered) in response to the ad tag. The ad tag may point to a publisher's server (acting as ad server 150) which communicates with the browser 116 to deliver the ad to be rendered by the browser 116. In other instances, the process of obtaining an ad may be more complex. For example, the ad tag provided to web browser 116 as part of web page 132 may instead point to a third party server (e.g., sell side platform server, or SSP server) that conducts an auction to identify the highest-paying ad. The web browser 116 may initiate an ad call by sending a request to the SSP identified by this pointer and in response, the SSP returns code back to the web browser 116 to cause the web browser 116 to access a publisher's server associated with the winning bid (after the SSP conducts the auction). The code provided by the SSP server may point to the publisher's server, but often may instead comprise a pointer causing the web browser 116 to communicate with a demand side platform server (DSP server) responsible for winning the bid, which then redirects the web browser 116 to access the ad provided by the publisher's server. In this latter case, the ad server 150 is considered to be the SSP server, the DSP server and the publisher's server.

App store server 160 may host one or more websites and/or web applications that allow a user to search, review, rate and download various applications that may be installed and run on mobile device 110 or computer 120.

Vendor server 180 may be a server hosting a website of a vendor through which goods (physical goods and applications, e.g.) or services may be purchased by a consumer. The website may include one or more web pages 182 formed as HTML documents which may have an embedded program 182a (e.g., script such as JavaScript) embedded therein. All or part of embedded program 182a may be the same as embedded program 132a.

As discussed in more detail below, identity server 140 may be configured to perform various tasks, such as provide durable ids DID 117 to mobile devices 110 and to later obtain such DIDs 117 from the mobile devices 110.

Mobile devices 110 and computer 120 may include various applications 114 installed therein, such applications for games, music, news, social media, utility (e.g., maps, travel, etc.) health, etc. In many instances, a user may have an option to download an application for free or pay for the same application. Rather than paying for an application, a user may instead elect to be receive advertisements through the application 114, such as having the application 114 provide advertising in the form of embedded banner ads or video ads in an image displayed by the application 114 on the mobile device 110 or computer 120, or the playing of advertisement videos prior to allowing the user to access and use the application. A user may instead to decide to purchase and download an ad-free application 114 or pay to stop receiving advertisements by reconfiguring a downloaded application 114 previously set to receive and display advertisements. Thus, a user may sample an application for free, and if advertisements are desired to be avoided, pay for the application. Or the user may determine that receiving advertisements is acceptable and continue to use the application without payment.

In providing advertisements to user, it is typically beneficial to both the advertising vendor and the user to have the user receive an advertisement of interest to the user, or otherwise targeting the interests of the user. A vendor benefits by providing advertisements to those users most likely to result in a sale of a vendor's product. A user often prefers advertisements in products and services that may be desirable for the user and provide a benefit to the user.

There are a variety of systems and tools to match advertisements to users. For example, web browser applications 116 may accept and store "cookies" on a cache of the web browser 116 (or similar information in a LocalStorage cache of the web browser 116) as bits of data that may later be retrieved and analyzed in later communications with the same or other web servers 130. Cookies may include first party cookies (1P cookies) that identify a web site and/or particular web page 132 that the web browser 116 has accessed. Cookies may also include third party cookies (3P cookies) that identify third party content provided by browsing a website but are not stored or content provided directly from the web site. For example, many advertisements are provided through accessing a web page 132, the content of which is provided from a third party, such as via ad server 150. If supported by a web browser, a such a third party cookie may be stored in the cache of the web browser to identify that the web browser of a user's device has been provided with a particular advertisement. Later communications via the web browser 116 with the same or other web servers 130 may provide such 1P cookies or 3P cookies to the web server to reveal attributes of the user which vendors may use to determine if an ad should be sent to such a user for a particular service or product of the vendor. The cache of the browser may be a folder created and/or accessible by the web browser 116 in which the cookies are stored, such as a "profile folder" "local settings" folder or a "user data" folder (name and location of such a folder being determined by different types of web browsers 116). Information (which may include the same information provided by cookies, such as the information in the DID cookies and IFA cookies described herein, including identifying code and encrypted or unencrypted DID and/or IFA data) may similarly be stored in and retrieved from a LocalStorage cache as provided by HTML5, or by other caches of the web browser 115 (e.g., image cache). This may be in addition or as an alternative to the use of cookies as described herein.

When the user accesses a web site via a non-mobile device or devices connected to network 10 via a non-mobile access point, such as computer 120 or mobile device 110 connected to LAN 192, the device may be identified by the IP address associated with the device. Although the IP address may be altered during subsequent use of the device (e.g., a dynamic IP address), a unique identifier stored in any first and third party cookies of the web browser 116 can be retrieved by a web server to relay the identity of the mobile device 110 even though the IP address has changed.

However, using cookies to identify mobile devices 110 connected to the network via cell network 190 is often problematic. For examples, may web browsers 116 of mobile devices 110 are not configured to store third party cookies. To identify mobile devices 110, many mobile operating systems 112 create and store an identifying code on the mobile device 110 which is transmitted to third parties via network 10 to identify the mobile device 110, such as to determine what advertisement may be sent to the mobile device 110. For example, Apple's™ iPhones™ create a unique code for each iPhone called an IDFA (IDentification For Advertisers) while Google's™ Android™ phones create a unique code for each Android™ phone called an AAID (Android Advertising ID). For the purposes of this disclosure, such identifiers are referred to herein as IFA's (113 in FIG. 1). Unless disabled by a user of the phone, such IFAs 113 are sent from a mobile device 110 to elicit an advertisement within an application of the mobile device 110. IFAs 113 may also be used for frequency capping, to limit the number of times same advertisement is sent to a user, and to attribute an advertisement to a later action of the user, such as clicking on an ad, downloading an application or signing up for something. IFAs are typically implemented to allow a user to opt out of providing an IFA, such as by providing a code of all zeros or all ones to be stored as an IFA although it no longer may identify the mobile device 110 (a code that is shared among multiple mobile devices 110).

Generation of the IFA may be performed by the mobile device 110 requesting a new IFA from a server associated with the OS 112 of the mobile device 110. For example, an iPhone may send a request to a server of Apple. Such a server may track assigned IFAs to identify unassigned IFAs and provide an unassigned IFA to the mobile device 110 which then stores the IFA at known location (e.g., a predetermined logical address within nonvolatile memory, a particular register, etc.) within the mobile device 110. The newly assigned IFA is therefore unique to the mobile device 110 for that type of IFA (e.g., a unique IDFA code or a unique AAID code). Generation of the IFA may be initiated by the OS 112 of the mobile device 110. In addition, in many implementations, the IFA 113 of the mobile device 110 may only be accessible through a request to the OS 112 of the mobile device, such as through use of an API of the OS 112.

Conventional use of IFAs 113 may have limited applicability. For example, some IFAs 113 are limited to use with applications 114 and are not useable with certain standard web browsers 116. For example, although Apple's™ IDFA may be implemented by applications running on Apple's™ iPhone™, Apple's™ Safari web browser 118 does not provide access to the IDFA of an iOS device. Thus, identification of an iPhone™ or other mobile device 110 using an IFA 113 (such as Apple's™ IDFA) by access via a web browser 116 is not possible.

Figure 2A:
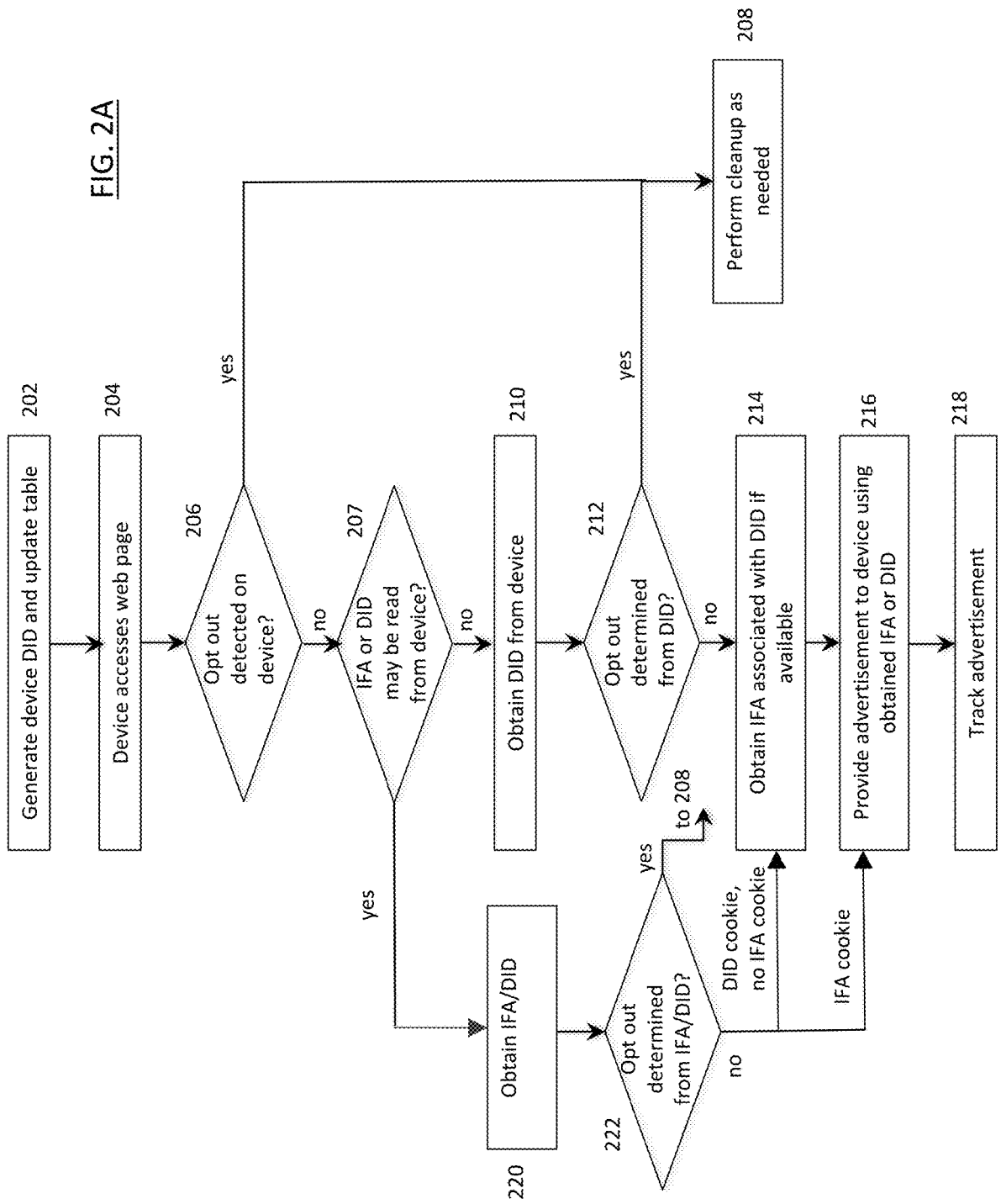
FIGS. 2A and 2G illustrate example methods according to embodiments.

FIG. 2A illustrates an example method according to one embodiment. The method of FIG. 2A may allow a mobile device 110 to be identified by the IFA 113 of the mobile device 110 via use of a web browser 116 even when the web browser 116 is not configured (i.e., unable) to access an IFA 113 of a mobile device 110 and/or is otherwise unable to provide an IFA 113 of the mobile device 110 to a web server 130 (or another device external to the mobile device 110). The method will be explained with respect to a mobile device 110 of FIG. 1 (that may be connected to the network 10 via cell phone network 190 or via wireless connection 192a through wireless LAN 192), but is applicable to other devices, such as computer 120 or a mobile device 110 connected to the network 10 through other types of connections. It will be appreciated that the systems and devices described herein (e.g., such as described with respect to FIG. 1) may be configured to perform the actions described with respect to the methods described herein, such as via software code. Such systems, devices and software code (e.g., as provided on a non-transitory computer readable medium, e.g., non-volatile memory, volatile memory, a hard drive (e.g., solid state drive), computer disk, etc.) are also exemplary embodiments this invention.

In step 202, a durable ID (DID 117) is generated and stored on the mobile device 110. The DID 117 may be generated and stored automatically without requiring user inputs or instructions dedicated to generation of the DID 117. For example, the DID 117 may be automatically generated when an application 114 is installed or run on the mobile device 110 or when the mobile device 110 accesses a web page without requiring any user interactions (or otherwise altering a user's interaction with the application or web page). The DID 117 is a code that is unique to the mobile device 116. Thus, each mobile device 110 having a DID 117 will have a DID 117 with a code unique to that mobile device 116. As explained in further detail herein, as part of generating the DID code 117 of a mobile device 110, identity server 140 may be accessed to determine a DID code that has not yet been assigned to a user device and perform various operations to store the determined DID code 117 in the mobile device 110. The DID 117 is considered durable as it retained by the mobile device 110 even after being shut down or completely without power. However, as discussed herein, the DID 117 may be removed from the mobile device 110.

In the example of FIG. 1, the DID 117 is stored in a cache of the web browser 116 of the mobile device 110, but the DID 117 may be stored in other locations of the mobile device 110. The DID 117 may be generated by running an application 114, such as an application 114 downloaded from app store server 160. The downloaded application 114 may comprise software code, such as an SDK (software development kit) 115, that upon being run by the mobile device 110, instructs the mobile device 110 to perform various operations to store the DID code 117 and to provide the IFA 113 of the mobile device 110 to identity server 140. For example, upon running the SDK 115 of application 114, the mobile device 110 may provide the IFA 113 of the mobile device 110 as part of a request to initiate generation of a DID code 117 to identity server 140. The identity server 140 may determine a unique DID 117 for the requesting mobile device 110 and store and associate this DID 117 and the IFA 113 of the mobile phone in a look-up table 144a of database 144 of identity server 140. FIG. 2C illustrates an example of such a look-up table 144a.

Step 202 may also be performed by generating the DID 117 by executing script on a browser 116 where the script is provided to the browser 116 as a result of the browser 116 accessing a web page or other type of web resource. For example, script 132a may be provide to mobile device 110 as a result of browser 116 of mobile device 110 accessing web page 132 of web server 130. Script 132a may then be executed by browser 116 to determine whether a DID 117 already is available for retrieving from mobile device 110. If no DID 117 is detected, execution of script 132a may cause generation and storage of a 117 DID on the mobile device, such as within one or more a caches of browser 116 of the mobile device 116. The identity server 140 may determine the IFA 113 of the mobile device 110, such as at a later time when the mobile device 110 runs an application 114 and SDK 115 within the application 114, as described herein. The identity server 140 may determine that the mobile device 110 already has been assigned a DID 117, such as by determining that the mobile device 110 has a DID cookie (e.g., a cookie containing the DID 117 and an identifier code identifying the cookie as a DID cookie), retrieve the DID 117 from the mobile device 110. The identity server 140 may then update the entry of the look-up table 144a containing the obtained DID 117 by storing the DID 117 in a field of that entry and thereby associating the IFA 113 and DID 117 of the mobile device. In addition, the identity server 140 may also update one or more entries of an ad tracking table 154*a* (described in more detail below) that contain the obtained DID 117 by storing the DID 117 in a field of each such entry and thereby associating the IFA 113 with each of these entries.

In step 204, the mobile device 110 having the DID 117 stored therein, accesses a web page (or other type of web resource), such as web page 132 on web server 130 (this mobile device may be referred to herein as an "accessing mobile device" even after such access has ended). Web page 132 may provide any variety of user content (e.g., content of web page 132 need not be associated with any downstream processing by the system). Note that when DID 117 is generated by executing script on browser 116 that is obtained from a web page in step 202, the web pages accessed by the mobile device 110 in steps 202 and 204 may be different from each other, associated with different domain names and/or hosted by different web servers 130.

In step 206, web server 130 hosting the web page 132 may determine if the mobile device 110 has opted out of allowing use of a DID 117 of the mobile device 110. For example, the web server 130 may review HTTP cookies stored in a cache of the web browser 116 to determine if an "opt-out" cookie has been stored therein, indicating an opt-out selection by the user of the mobile device 110. In addition, or alternatively, the web page 132 may provide an opt-out link associated with a displayed opt-out "button" displayed on the mobile device display by the web browser 116, where selection of the opt-out button (e.g., a touch input or mouse click) causes an opt-out request to be sent to identity server 140. If such an opt-out selection (e.g., opt-out cookie or opt-out request) is detected, the method proceeds to step 208 where any cleanup actions that may be needed are performed. The method may be terminated after step 208.

If no opt-out is detected in step 206, the method may proceed to step 207, where the web browser 116 of the accessing mobile device 110 is examined for storage (e.g., in a cache of the web browser 116) of an IFA and/or DID 117 that may be read by a server, such as identity server 140. For example, in response to executing script obtained from accessing web page 132, web browser 116 may be redirected to communicate with identity server 140. Identity server 140 may attempt to read any cookies containing an IFA of the mobile device 110 (which may be referred to herein as an IFA cookie) and/or any cookies containing a DID 117 of the mobile device 110 (which may be referred to herein as a DID cookie) and/or any cookies containing an ID assigned to the mobile device 110 that may be used to identify the mobile device 110 (which may be referred to as an ID cookie, such as an IFA cookie or an DID cookie). Alternatively, or in addition, identity server 140 may examine the LocalStorage cache of web browser 116 for an IFA, DID or other ID assigned to the mobile device. An IFA cookie may include a predetermined code in addition to the IFA to identify the cookie as an IFA cookie. Similarly, a DID cookie may include a different predetermined code in addition to the DID identifying the cookie as a DID cookie. The IFA 113 and DID 117 may be stored in LocalStorage and/or in cookies unmodified (e.g., the IFA 113 and the DID 117 may be stored in LocalStorage or as part of a cookie in the original binary code assigned as the IFA 113 and DID 117). Alternatively, the IFA 113 and DID 117 may be stored in an encrypted format in LocalStorage or cookie. The storage of the IFA 113 and DID 117 may have been performed previously by a server, such as identity server 140, as a result of an earlier access by web browser 116 of this server.

The existence of an IFA cookie and/or DID cookie and/or IFA in LocalStorage and/or DID in LocalStorage in the mobile device 110 may be identified if a predetermined code is found in a cookie or data of LocalStorage stored in the cache of the web browser 116. For example, all IFA cookies may include the same first predetermined code and all DID cookies may include the same second predetermined code. Such predetermined code may comprise a URL code of a web page accessed by the mobile device 110 (e.g., a web page of identity server 140) as part of creating and storing the IFA or DID cookie. Similar predetermined code may be similarly used for such identification in LocalStorage. Such identification of a such a predetermined code may be performed by the web browser 116 by executing script 132*a* obtained in step 204 from web server 132, or may be performed by identity server 140 in response to web browser 116 accessing identity server 140 (e.g., in response to being redirected to access a web page of identity server 140 which results in cookies of the web browser 116 and/or LocalStorage data being transmitted to and analyzed by identity server 140). If a cookie containing an IFA or DID is found in the accessing mobile device 110, the method proceeds to step 220, otherwise the method proceeds to step 210.

In step 210, the DID 117 of the accessing mobile device 117 is obtained. For example, a script 132*a* (such as JavaScript™) may be provided to the web browser 116 from web server 130, such as script 132*a* that is part of the HTML document constituting the downloaded web page 132 accessed by the mobile device 116. This script 132*a* may be provided as an SDK embedded in web page 132, which may be the same SDK (e.g., an exact copy) of the script used to generated a DID in step 202 (i.e., the SDK embedded in web page 132 may configure a browser to perform the functions described with respect to steps 202 and 206, although such steps are also contemplated to be performed by a browser as a result of accessing different web pages each having such an SDK embedded therein). Upon executing the script 132*a*, the web browser 116 may provide the DID 117 to a server via network 10. For example, the web browser 116 may provide the DID 117 to the identity server 140 and/or to the web server 130, which may be in the form of sending code to the identity server 140 and/or the web server 130, or by performing a series of actions monitored by the identity server 140 and/or web server 130 from which that server (140 and/or 130, e.g.) may determine the DID 117 of the mobile device 110.

In step 212, the obtained DID code 117 is used to check whether or not opt-out has been selected by the user of the accessing mobile device 110. For example, the DID code 117 obtained from the mobile device 117 may be examined to determine if it is an opt-out code. The opt-out code may be a predetermined code that reserved by identity server 140 to represent an opt-out selection of a mobile device 110 (e.g., all zeros or all ones, or some other predetermined code). If the obtained DID code 117 is an opt-out code, the process may proceed to step 208 (where any desired clean up action may be performed). As another example of checking for opt-out, the obtained DID 117 need not be determined to be an opt-out code. Rather, identity server 140 may access the entry (e.g. record) in the look-up table 144*a* stored in database 144 containing the DID 117. The entry may include a flag or other indicator to indicate whether the received DID 117 is associated with an opt-out request by or associated with a particular mobile device 110. In an embodiment where web server 130 initially obtains the DID code 117 from mobile device 110, the web server 130 may send the obtained DID 117 of the accessing mobile device 110 to the identity server 140 which may then check for an opt-out flag in the look-up table 144*a*. In this instance, the web server 130 may receive the results of this check from the identity server 140 (in which case, it may be responsible for performing the actions of step 208) or alternatively, the identity server 140 may be responsible for performing the actions of step 208.

If the identity server 140 determines the DID 117 is associated with an opt-out request, the identity server 140, the process may then proceed to step 208 to perform any desired cleanup actions. For example, the identity server 140 or web server 130, having determined an opt-out is associated with the obtained DID 117, may provide script to the accessing mobile device 110 (e.g., to be run by the web browser 116 of the mobile device 110) to erase the obtained DID 117 from the mobile device 110. Erasure may be in the form of altering the code of the DID 117 of the accessing mobile device to store the opt-out code (e.g., all zeros, or all ones, or some other code). It will be apparent that the opt-out code may be shared between multiple mobile devices 110 (to indicate an opt-out of these mobile devices 110) and as it is not unique, the opt-out code does not identify any particular mobile device 110.

If an opt-out is not determined in step 212, the process proceeds to step 214 where the IFA 113 associated with the DID 117 in look-up table 144*a* is obtained by the identity server 140 by identifying the entry in the look-up table 144*a* containing the DID 117 obtained in step 210 or step 220, and obtaining the IFA 113 associated with the DID 117 in that look-up table entry.

The IFA 113 obtained by identity server 140 may be the same as that currently stored in the accessing mobile device 110. However, it should be noted that the IFA 113 of the mobile phone 110 may have been modified (or the user may have opted out of IFA 113 usage) since the previous IFA 113 was stored in the database 144 of the identity server 140.

The IFA 113 obtained in step 214 may be sent to the web server 130 in embodiments where the web server 130 performs actions associated with step 216. Alternatively, the web server 130 may not perform actions associated with step 216 and identity server 140 may directly communicate with web browser 116 to perform actions associated with step 216. In the example where web server 130 requests an IFA from identity server 140, it should be appreciated that, in response to the same request received from the web server 130 (providing the obtained DID 117 from the requesting mobile device 110), either the IFA 113 may be provided (step 214) or information indicating that the DID 117 is associated with an opt-out (step 212) may be provided by the identity server 140.

In step 216, based on the obtained IFA 113, mobile device 110 may be provided an advertisement (e.g., text, audio, still image, and/or video) which is then rendered (e.g., displayed and/or played) by the web browser 116 of the mobile device. For example, the obtained IFA 113 may be provided to the ad server 150 which then uses the IFA 113 to select an advertisement and returns the appropriate information (such as a URL link) to the web browser 116 of the mobile device 110 (via an appropriately formatted command or script) for display of the advertisement by the web browser 116. Use of the IFA 113 can be reserved, non-reserved, network, RTB, client side or server side header bidding, etc.

In one example, script 132*a* provided to web browser 116 of the requesting mobile device 110 (in step 204) includes an ad tag that includes a call to obtain the requesting mobile device's IFA 113 as described herein (e.g., from an external server 140 (step 214) or from reading data from a cache of the web browser 116, such as reading an IFA cookie or IFA data in LocalStorage (step 220)). After obtaining its IFA 113, the web browser 116 acting on the ad tag initiates an ad call including the IFA 113. The IFA 113 is then used by the ad server 150 to select and deliver an ad to the web browser 116 (step 216).

In another example, script 132*a* provided to web browser 116 of the requesting mobile device 110 (in step 204) includes a call to obtain the requesting mobile device's DID 117 as described herein (e.g., from an external server in step 210 or from reading data from a cache of the web browser 116, such as reading a DID cookie or DID data in LocalStorage in step 220). In this example, the DID 117 is returned to the requesting mobile device 110 from the identity server 140 (or another server, such as web server 130 in the alternative implementation) as part of step 210 when the DID 117 is obtained via step 210. After obtaining its DID 117, the web browser 116, acting on the ad tag, sends an ad request including the DID 117, which is then used by the ad server 150 to select and deliver an ad to the web browser 116 in step 216. In this example, step 214 may include ad server 150 obtaining the IFA 113 of the requesting mobile device 110 by (a) receiving, from the web browser 116, the ad request including the DID 117 obtained by the requesting mobile device (e.g., in step 210 or 220) and (b) obtaining the IFA 113 of the requesting mobile device 110 from look-up table 144*a* of the identity server 140. The ad server 150 may then use the obtained IFA 113 to select and deliver an ad to the web browser 116 of the requesting mobile device 110 (step 216). Alternatively, in step 214, upon accessing the look-up table 144*a* of server 140, if no IFA 113 is found to be associated with the DID 117 included with the ad request sent from the web browser 116, the ad server 150 may use the DID 117 in step 216 to select and deliver an ad to the web browser 116 of the requesting mobile device 116 (in which case, an IFA would not be used in step 216 to select and deliver an ad). In these latter implementations, an IFA 113 of the requesting mobile device 110 need not ever be sent to (or stored in a cache of the web browser 116 of the requesting mobile device 110) as part of any steps of the method and configuration of the system.

It will be appreciated that when the web browser 130 obtains the IFA 113 from the identity server 140, the actions of identity server 140 described with respect to step 216 may be instead performed by the web browser 130.

In step 218, the advertisement may be tracked if desired. For example, after providing the advertisement to the accessing mobile device 110 in step 216, one or more later actions of the accessing mobile device 110 may be determined to be associated with the same mobile device 110 that had been previously provided with the advertisement. Such actions may include downloading (e.g., from the app store server 160), installing and/or running an application 114, making a purchase through a vendor website 182 via web browser 116, signing up for something (e.g., providing name and/or contact information, such as an e-mail address) via accessing a server via web browser 116, etc.

Such later actions may be determined to be those of the same mobile device 110 previously served the advertisement by (a) obtaining the IFA of this later accessing mobile device 110 and (b) determining that the IFA 113 of this later accessing mobile device 110 matches the IFA 113 of the mobile device 110 to which the advertisement was previously served. An ad tracking table (see 154*a* of FIG. 2B, e.g.) may be implemented to perform these functions. The obtained IFA 113 may be used for other purposes than those described herein, such as other advertising purposes.

Returning back to step 207, if a cache of the browser 116 is found to include data that may be read by an external server (e.g., identity server 140) that includes an IFA 113 and/or DID 117 (e.g., a cookie containing an IFA 113 (an IFA cookie) or a cookie containing a DID 117 (a DID cookie) or IFA data or DID data in LocalStorage), the method proceeds to step 220 where the IFA 113 and/or DID 117 is obtained from such data. For example, either the web browser 116 or an external server, such as identity server 140, may analyze the cookies stored in a cache of the web browser 116 of the accessing mobile device 110 to determine the existence of an IFA cookie and/or a DID cookie (such as reviewing such cookies for a corresponding predetermined code that identifies one of these cookies as an IFA cookie or a DID cookie, as described herein), and/or similarly analyze the data read from LocalStorage. For example, the IFA cookie (or DID cookie) may be obtained by the identity server 140 and the portion containing the IFA data 113 (or DID data 117) may be identified. In some examples, the IFA data of the IFA cookie (or DID data of the DID cookie) may be in an encrypted format, and the original IFA code 113 (or original DID code) may be obtained by decrypting the IFA data of the IFA cookie (or DID data of the DID cookie) by the identity server 140 using a known key. The original IFA code 113 may have been previously obtained from the mobile device 110 as described elsewhere herein and then stored in as an IFA cookie (in encrypted or unencrypted format) on the accessing mobile device 110 (e.g., as described herein with respect to step 214 of FIG. 2A and in particular, step 319 of FIG. 3B). For example, the process of FIG. 2A may have been performed previously with respect to the same accessing mobile device 110 and the same or different web server 130, where no IFA cookie was found in step 207 but later obtained in step 214 and stored as in an IFA cookie in step 214 in the web browser 116 of the accessing mobile device 110. Similar processes may be performed with respect to data read from other caches of the browser 116, such as LocalStorage.

In step 222, the IFA 113 and/or DID 117 read from a cache of the browser 116 in step 220 is used to determine if the mobile device 110 is associated with an opt-out. For example, the identity server 140 may access look-up table 144a to determine if an entry of the look-up table 144a contains an opt-out flag associated with the obtained IFA 113 and/or DID 117, similar to the process performed at step 212. If an opt-out is determined from the IFA 113 and/or DID 117 in step 222, the process proceeds to step 208 where any needed cleanup is performed. If an opt-out is not found, and an IFA obtained in step 220, the process proceeds to step 216. If an opt-out is not found and a DID was found in step 220 (e.g., no IFA was found in step 222), the process proceeds to step 214.

As discussed herein, upon detecting an opt-out, prior to termination of the method of FIG. 2A, cleanup actions may be performed in step 208. For example, all meta-data associated with the IFA 113 of the mobile device 110 selecting an opt-out may be erased, such as erasing data fields of look-up table 144a. For example, the entry of the look-up table 144a containing the IFA 113 associated with the opt-out selection may be set to the predetermined opt-out code (e.g., all zeros as shown in FIG. 2C or all ones). When the opt-out cleanup process of step 208 is initiated by an opt-out request initiated by user selection of an opt-out button of a rendered web page 132 (as described with respect to step 206), the IFA 113 may be obtained either from obtaining the IFA from reading an IFA from a cache of the web browser 116 (as described with respect to step 220) or by obtaining the DID 117 and then obtaining the IFA 113 associated with the DID 117, as described with respect to steps 210 and 214, respectively.

In addition, as part of the cleanup of step 208, the identity server 140 may communicate with the web browser 116 of the opting-out mobile device 110 erase the DID 117 of the opting-out mobile device 110, such as causing the mobile device 110 to store the predetermined opt-out code in place of a DID code 117 and thus overwrite the DID code 117. For example, this opt-out code may be stored in the mobile device 110 by implementing the process described with respect to FIG. 3C for the opt-out code. For example, the mobile device 110 may be instructed by the identity server 140 to access all n web pages (as described below) using HTTPS protocol. In addition, the identity server 140 may communicate with the web browser 116 of the opting out mobile device 110 to erase cookies that have been previously stored in a cache of the web browser 116 as part of performing one or more of the steps of FIG. 2A, such as erasing an IFA cookie containing IFA data as described below with respect to step 319 of FIG. 3B. Similar erasures may be made with respect to IFA and/or DID codes in LocalStorage of the web browser 116. In addition, the identity server 140 may communicate with the opting out mobile device 116 store an opt-out cookie in the cache of its web browser 116. The opt-out cookie may contain a predetermined code is found to identify the cookie (which may be the same predetermined code to identify the IFA cookie) and contain the opt-out code rather than IFA data. Alternatively, the predetermined codes used to identify the opt-out cookie and the IFA cookie may be different. The opt-out code may be written to other caches of the web browser 116, such as LocalStorage.

As described below with respect to FIG. 2D, the method of FIG. 2A may be repeatedly performed with respect to each of a plurality of different mobile devices 110 and a plurality of different computers 120. Further, for each of these devices 110, 120, the method of FIG. 2A may be performed repeatedly as part of a device's access of different web pages, delivery of different advertisements, and as part of running of different applications. Multiple entries of look-up table 144a and ad tracking table 154a in FIG. 2B reflect such repeated implementations.

It should be appreciated that not all steps of FIG. 2A need to be implemented. For example, implementation of steps associated with use of an IFA cookie or an IFA in LocalStorage may be omitted (e.g., 207, 220, and 222 of FIG. 2A and 319 of FIG. 3B). Different opt-out provisions may also make more or less steps possible with respect to opt-out related actions. Further, different uses of the IFA 113, the DID 117 and/or their association are possible. It will thus be apparent that providing an advertisement in step 216 and tracking an advertisement in step 218 are each optional and other or additional actions may be performed in place of or in addition to one or both of steps 216 and 218.

Figure 3B:
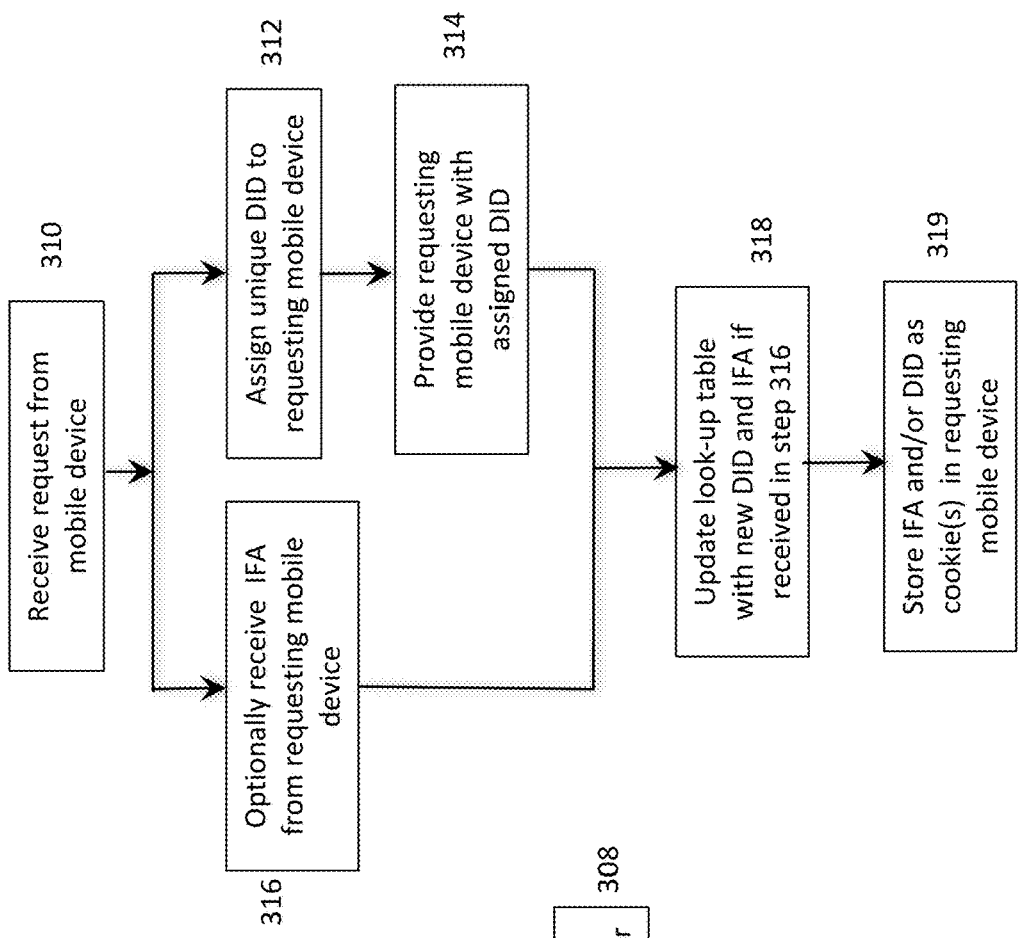
Figure 3A:
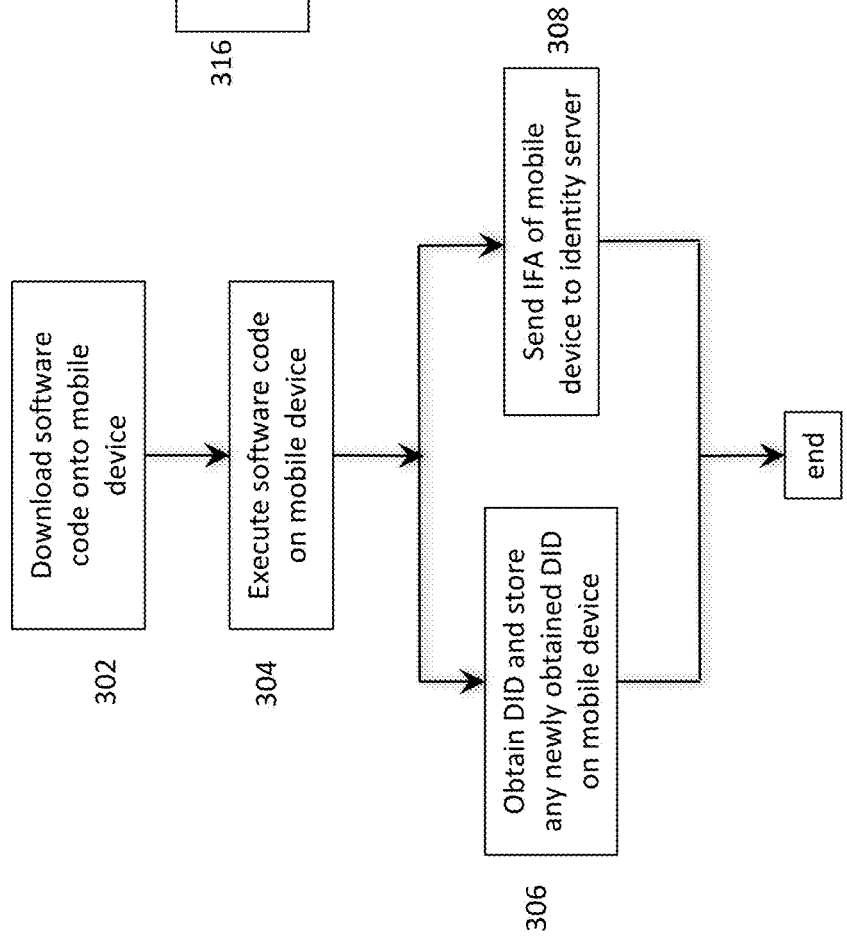

FIG. 3A illustrates one example of steps performed by a mobile device 110 that may be performed as part of generating a device DID 117 in step 202 and/or part of obtaining a DID 117 (such as step 203 described below). In step 302, a user of a mobile device 110 may initiate download of software code, such as an application 114 or software code obtained from a web resource, such as web page 132 of web server 130. For example, a user may select a particular application to initiate download through a touch screen or other user interface of the mobile device 110, which then causes the mobile device 110 to communicate with ad server 150 (e.g., over cell phone network 190 and network 10) to obtain the selected application 114 and store the same in the mobile device 110. For example, a user may instruct browser 116 through a touch screen or other user interface of the mobile device 110 to access web page 132, resulting in HTML document 132 (including script 132a) being downloaded onto the mobile device 110.

In step 304, the downloaded software code is executed by the mobile device. For example, application 114 is installed and run by the mobile device 110. For example, the downloaded HTML document 132 is rendered by web browser 116 of the mobile device 110.

In step 306, a software code segment of the downloaded software code is executed by the mobile device 110 to check for the existence of a DID 117 previously stored on the mobile device 110 and to provide the DID 117 to the identity server 140 if present. The DID 117 may be determined to exist by identifying a DID cookie in a cache of the web browser 116 and/or DID code in LocalStorage of the web browser 116 (by the web browser 116 or the identity server 140) and/or may be determined to exist in other ways, such as by performing the process of FIG. 3E described herein.

If a DID 117 is determined not to be present on the mobile device 110, a DID 117 having a code unique to the mobile device 110 may be generated and stored within the mobile device 110, such as storing the DID 117 within one or more caches of the web browser 116. The mobile device 110 may send a request to the identity server 140 to request the generation of the unique code of the DID 117, and communicate with the identity server 140 to have the DID 117 stored within the mobile device 110. The DID 117 obtained in step 306 (whether a DID 117 generated previous to the latest performance of step 306 or a newly generated and stored DID 117 obtained in the current performance of step 306) may be communicated to the identity server 140.

Step 306 may comprise executing a software code segment to cause mobile device 110 to issue one or more requests to access web pages or other web resources of the identify server 140, such as by a web browser (e.g., 116) of mobile device 110. The software code segment may be an SDK 115 that is embedded within the application 114. The software code segment/SDK 115 may be executed in step 306 as part of the installation of the application 114 onto the mobile device 110 or as part of running the application 114 by the mobile device 110. Thus, running of the application 114 may be skipped in certain implementations of step 306. The software code segment may comprise script 132a provided obtained upon browser 116 accessing web page 132 (HTML document, e.g.) web server 130 and executed by the web browser 116 upon rendering web page (HTML document, e.g.) 132.

In step 308, a software code segment of is executed by the mobile device 110 to send the IFA 113 of the mobile device 110 to the identity server 140. When FIG. 3A is performed by the mobile device 110 as part of a web page access (e.g., web page 132) and implemented by web browser 116 obtaining and executing the software code segment (e.g., script 132a), web browser 116 may not be configured or otherwise be able to obtain the IFA 113 of the mobile device 110 (due to configuration of the web browser 116 and/or OS 112, e.g.). Thus, step 308 may be skipped when the method of FIG. 3A is implemented by a web browser.

The software code segment executed to send the IFA 113 of the mobile device 110 in step 308 may be a software code segment of a downloaded application 114 (e.g., SDK 115) that is executed by the mobile device 110. The IFA 113 and the DID 117 that may be provided as part of step 306 may be sent together at the same time in the same communication (e.g., same packet) to the identity server 140. This software code segment may be part of the same SDK 115 that is embedded within the application 114 or different. The software code segment/SDK 115 may be run in step 308 as part of the installation of the application 114 onto the mobile device 110 or as part of running the application 114 by the mobile device 110. Thus, running of the application 114 may be skipped in certain implementations of step 308. Step 308 may be performed after, before or prior to obtaining the DID 117 from the identity server 140 in step 306. For example, sending the IFA 113 to identity server 140 may be performed as part of the request by the mobile device 110 to the identity server 140 for the DID 117 in step 306.

For example, an API (application programming interface) of the OS 112 may be accessed by the SDK to obtain the IFA 113 which then may be sent to identity server 140. Such an API may be in the form of a software call to obtain the IFA 113 value associated with an IFA pointer providing the memory address of where the IFA 113 is stored within a non-volatile memory of the mobile device 110. After the application 114 obtains the IFA 113, the application may then send the IFA 113 to identity server 140 to allow the identity server 140 to associate the IFA 113 with the DID 117 provided in step 306.

For example, when the mobile device 110 is an iPhone™, the SDK 115 may be run to obtain the IDFA, such as by using the Apple Swift language you would get the IDFA by calling ASIdentifierManager.sharedManager( ).advertisingIdentifier (after importing or linking with AdSupport framework).

FIG. 3B illustrates one example of steps that may be performed by identity server 140 as part of generating a new DID 117 for a mobile device 110 in step 202. In step 310, identity server 140 receives a request from a mobile device 110 for a DID that is not currently assigned to any other mobile device 110. This request may be initiated in response to the mobile device 110 executing SDK 115 via running an application 114 or may be initiated by the mobile device 110 executing script 132a obtained upon accessing a website 130.

In step 312, the identity server 140 identifies a DID code that is not assigned to any mobile device 110. The identity server 140 assigns this unique DID code to the requesting mobile device 110 and reserves this DID code from assignment to other mobile devices 110 that may later request a DID from the identity server 140.

In step 314, the identity server 140 provides the requesting mobile device 110 with the newly assigned DID code 117. The identity server 140 may communicate with the requesting mobile device 110 to cause the assigned DID code 117 to be stored in the requesting mobile device 110. The DID code 117 may be stored in a cache of the web browser 116 of the mobile device 110. In some examples, the identity server 140 sends the newly assigned DID code 117 to requesting mobile device 110 via one or more packets over the network 10 using TCP/IP communication protocol.

In step 316, the identity server may receive the IFA 113 of the requesting mobile device 110. The IFA 113 may be received from the mobile device 110 as part of the request of the mobile device 110 in step 310. The IFA 113 may also be received from the mobile device 110 after the DID code 117 is assigned to the mobile device 110 and the DID code 117 is stored in the look-up table 144a as part of step 318. When the request (step 310) for a DID is initiated by the mobile device 110 in response to browser 116 of the mobile device 110 executing script (such as 132a obtained from accessing web page 132), the browser 116 may be unable to obtain the IFA 113 due to the configuration of the mobile device 110, such as due to the configuration of browser 116 and/or OS 112 of the mobile device 110. Thus, when the request for a DID is initiated by the mobile device 110 in response to browser 116 executing a script, step 316 may be skipped. However, when the request for a DID is initiated by the mobile device 110 in response to application 114 executing an SDK 115, step 316 may be implemented.

In step 318, the identity server 140 updates look-up table 144a of database 144 by creating a new entry in the look-up table 144a to store the DID code 117, and if an IFA code 113 is received (step 316), store and associate the newly assigned DID code 117 and IFA code 113 (represented in hexadecimal format in FIG. 2C). In step 318, the identity server 140 may store both the DID code 117 and IFA code 113 together as part of the creation of a new entry in the look-up table 144a. Alternatively, when a new entry is created in the look-up table 144a, only the DID code 117 may be stored (without any associated IFA 113) in the newly created entry. When the IFA 113 of the mobile device is later identified and obtained (e.g., through execution of SDK 115 of an application 114), the look-up table 144a may be updated to store and associate the IFA 113 with the previously generated and obtained DID 117 of this mobile device.

FIG. 2C illustrates one example of look-up table 144a, comprising a plurality of entries (an entry corresponding to a row in FIG. 2C), with each entry comprising a unique DID code 117 associated with an IFA 113 (or an opt-out code as a DID code for those mobile devices 110 having selected an opted out). The IFA 113 may also be unique to the mobile device 110 and/or unique to the mobile device 110 for IFAs 113 of the same type (e.g., if the IFA 113 is Apple's IDFA, an IDFA code unique among all devices assigned an IDFA). The IFA 113 may be later obtained, and thus some initial entries in the look-up table 144a may not have an IFA 113 stored in the device IFA field, as shown with respect to the entry having a device DID of "AB99". For example, after creating the entry for the device assigned DID "AB99" entries of other mobile devices 110 may be added. Later, the IFA 113 of the mobile device assigned DID "AB99" may be obtained and its entry updated in look-up table 144a by adding the later obtained IFA 113.

The look-up table 144a in FIG. 2C also comprises an entry (e.g., a flag bit) to indicate an opt-out selection of a mobile device 110 associated with the IFA 113 (in this example, opt-out flag bit set to 1 indicates an opt-out, while opt-out flag bit set to 0 indicates no opt-out). In this instance, mobile devices 110 having IFAs 7D7D and 2323 have been identified as having opted out, and thus provided with an opt-out flag of 1 to indicate an opt-out. The entries for IFAs 7D7D and 2323 have thus had their unique DID codes erased, in this instance by setting the Device ID field of these entries in look-up table 144a to the opt-out code (0000 in this example). It should be appreciated that an opt-out code is not a DID 117 and thus not unique to any particular mobile device 110 although it may be obtained and stored in a manner similar to a DID 117.

In step 319, the identity server 140 may store the IFA 113 and/or DID 117 received from the requesting mobile device 110 in step 316 as a cookie (e.g., a first party cookie) in the mobile device 110 (e.g., such as within a standard cache of the web browser 116 of the mobile device 110) or written into another cache of the web browser (e.g., LocalStorage) by the identity server 140 (e.g., with a write command). The IFA 113 and/or DID 117 may be stored as a cookie or in LocalStorage as part of the web browser's 116 access of web pages or other web resources of the identity server 140 in steps 306 and 314 as described below with respect to FIG. 3C. Each of the IFA 113 and/or DID 117 as stored in the requesting mobile device 110 may be encrypted and the key for decrypting the encrypted IFA 113 and/or DID 117 may be stored on the database 144 of the identity server 140. The IFA cookie containing the IFA 113 may also include information to identify the cookie as one storing the IFA 113 (e.g., an IFA cookie), such as information identifying a web page and/or domain of the identity server 140, or some other predetermined or known identifying code. Similarly, the DID cookie containing the DID 117 may have a similar code to identify the cookie as a DID cookie. Similar identifying information may be written and stored with an IFA and/or DID in the web browser's LocalStorage or other cache. The decryption key may be used to decrypt the encrypted IFA 113 when it is later accessed to obtain the original code representing the IFA 113 in a conventional manner. In some implementations, different decryption keys may be generated and used for different IFAs and the decryption key may be stored in a field of an entry of the look-up table 144a of the database 144.

FIG. 3C illustrates one example of providing the DID code 117 and initial storage of the provided DID code 117 in the requesting mobile device 110 that may be performed as part of steps 306 and 314. The DID code 117 has n bits. For purposes of description, the following description provides a 16-bit DID code (i.e., n=16), although the DID code 117 may be implemented in other bit lengths (e.g., 32 or greater, such as 64 or greater). Each bit of the DID code 117 is individually referenced herein by their bit number within the DID code 117, (e.g., DID-bit0, DID-bit1, . . . DID-bit15 or as DID-biti (where i=0 to (n−1)) where a bit number of zero (0) is the least significant bit of the DID code 117 and the (n−1)th bit number is the most significant bit of the DID code 117. In this example, the identity server 140 has selected a DID code of 0x0325 (corresponding to the 16 bit binary code of "0000 0011 0010 0101") as a unique and previously unassigned DID code 117 to be assigned to a requesting mobile device 110. Each bit number of the binary DID code may be associated with a different web page (or other web resource accessible by a web browser) of a different website (e.g., having a different domain name). In the example illustrated in FIG. 3D, bit number 0 of the DID code 117 is associated with the web page b0.identity.com/img.jpg (and thus associated with the website having the domain name b0.identity.com) and bit numbers 1 to 15 of the DID code 117 are similarly associated with corresponding web pages of domains b1.identity.com, b2.identity.com, etc., respectively.

At step 320, identity server 140 configures these n web pages to communicate in a selected protocol, here, either unsecure HTTP or HTTPS, where n is the number of bits of the DID code 117 (in this example, n=16). In this example, if the value of DID-biti is equal to 0, the web page http://www.bi.identity.com/img.jpg is configured to communicate via unsecure HTTP. If the value of DID-biti is equal to 1, the web page http://www.bi.identity.com/img.jpg is configured to communicate using the protocol HTTPS and in addition, to provide an HTTP response header to any web browser attempting access via unsecure HTTP. The HTTP response header provided by the HTTPS web site instructs the web browser to retry the connection via HTTPS. The HTTP response header field in this example is named "Strict-Transport-Security" to implement an HSTS (HTTP strict transport security) and contains a field value providing a time period to implement an HSTS policy between the browser and the website. As part of implementing such an HSTS policy, the HTTP response header causes the web browser 116 to update an HSTS cache of the web browser 116 to identify the web site (the domain name) as an HTTPS website so that any future attempts to access the website will be performed using the protocol HTTPS, even if the original instruction to the browser directs the browser to communicate via unsecure HTTP.

Thus, in the example illustrated in FIG. 3D where the obtained unique DID code 117 is 0x0325 (hexadecimal value 0325 having binary code of "0000 0011 0010 0101"), the web pages associated with bit numbers 0, 2, 5, 8 and 9 (each having a bit value of 1) are configured to provide the HTTP response header with a header field name of "Strict-Transport-Security" to direct a web browser access request to communicate with the web page via HTTPS. Such a response header may be referred to herein as an HSTS response header. The value of the field provided with HSTS response header indicates a time period to implement HTTPS communications between the browser and the website. The web pages associated with the remaining bit numbers of the DID code 117 (each having a bit value of 0) are not configured to provide any such HSTS response header to an accessing web browser but instead may be configured to provide content from that web page to an accessing web browser via unsecure HTTP.

In step 322, after configuring the n web pages, identity server 140 instructs requesting mobile device 110 to initiate access of the n web pages (e.g., those illustrated in FIG. 3D) associated with each bit number of the DID code. In step 324, the requesting mobile device 110 sends n requests to access the n web pages with the same protocol, such as n HTTP requests to access the n web pages with an unsecure HTTP protocol. These n HTTP requests result from the mobile device 110 executing SDK 115 provided with application 114 or may result from the mobile device 110 executing script 132a obtained from accessing website 130, for example. As noted herein, these accesses of n web pages need not result in a corresponding rendering by the accessing requesting mobile device 110. In addition, although the example of FIG. 3C refers to access of n web pages, n web resources may be accessed by the requesting mobile device 110 that need not be web pages.

In step 326, for each bit number of the DID code having a bit value of 0 in the newly assigned DID code 117, the web browser 116 of the requesting mobile device 110 may successfully access (via unsecure HTTP, e.g.) the web page (and website) corresponding to this bit number. Each such request may be in the form of an HTTP GET request, e.g. Such access may comprise a download of some content from these web pages. The content may comprise a small amount of image data, such as a single pixel image or an image of 10 pixels or less, or 50 pixels or less, e.g. In some examples, the requesting mobile device 110 need not display or otherwise act on the content downloaded from the web page.

In step 328, for each bit number of the DID code having a bit value of 1 in the newly assigned DID code 117, the web browser 116 of the requesting mobile device 110 receives an HSTS response header from the website corresponding to this bit number in response to the attempt by this web browser 116 to access this website via unsecure HTTP. As noted, the HSTS response header may be an HTTP response header with a field named "Strict-Transport-Security".

In step 330, in response to each HSTS response header received by the web browser 116, the HSTS cache of the web browser 116 of the requesting device is updated. For each website from which an HSTS response header was received, the HSTS cache may store the domain name (e.g., in the form of a domain/host combination) of each website to identify the website (and its web pages) and a flag (which may be referenced herein as an HSTS flag) to instruct the web browser 116 that any future communication with the associated website should be via HTTPS. For example, if the web browser 116 is later directed to access a website via unsecure HTTP and that website is associated with an HSTS flag in the HSTS cache of the web browser 116, the web browser 116 will not perform any communications via unsecure HTTP with this website, but instead communicate via HTTPS with this website.

In step 332, the web browser 116 of the requesting device may successfully access web sites from which an HSTS header response was received via HTTPS protocol. Such access may comprise a download of some content via from the web page of this website. The content may comprise a small amount of image data, such as a single pixel image or an image of 10 pixels or less, or 50 pixels or less, e.g.

Figure 3E:
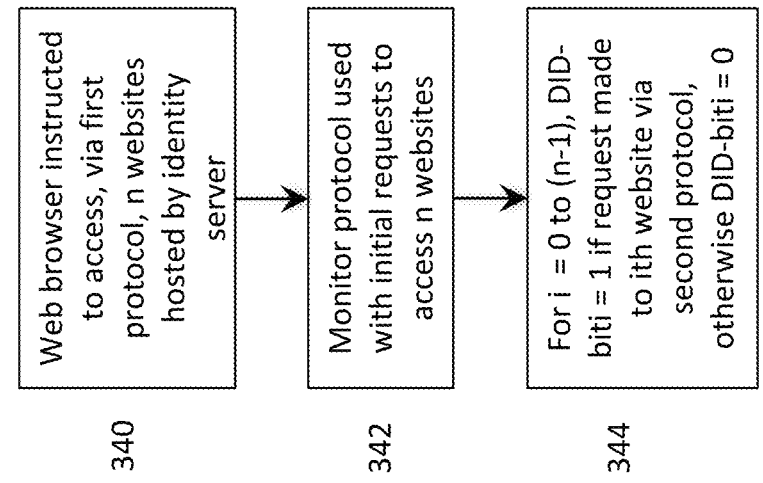

FIG. 3E illustrates an exemplary method for obtaining the DID 117 from a mobile device 110 that may be performed as part of step 210 (and as part of checking for the existence (e.g., previous storage) of a DID 117 on a mobile device 110 as described herein, such as in step 202). In step 340, web browser 116 of the mobile device 110 is instructed to access via unsecure HTTP each of the n websites associated with each of the n bit numbers of the DID code 117. Continuing with the example provided with respect to FIGS. 3C and 3D, the web browser 116 of the mobile device 110 may be instructed to access via unsecure HTTP each of the sixteen web pages www.bi.identity.com/img.jpg for i=0 to n (in this example, 0 to 15, but may be 32 or more, such as 64 or more). The instructions to access these n websites may be provided by various sources, such as via script 132a or 182a provided via website access by the web browser 116 (e.g., via web pages 132 or 182). Alternatively, these instructions to access these n websites may be provided by running SDK 115 (provided with application 114) run as part of installing the application 114 or running the application 114. In this example, the n websites are hosted by the identity server 140 and the DID 117 is thus obtained by the identity server 140. However, it will be appreciated that the n websites may be hosted by another server (e.g., web server 130) and the DID 117 may be obtained by that server.

In step 342, identity server 140 monitors the web browser's 116 incoming requests to access each of the n web pages (or other type of web resource) and determines if each of these requests is performed via unsecure HTTP or HTTPS.

In step 344, the DID code 117 is obtained by associating bit values of "0" with unsecure HTTP requests and bit values of "1" with HTTPS request. Specifically, since the instructions provided in step 340 are to access each of the n web pages via unsecure HTTP, any corresponding request from web browser 116 communicated via HTTPS to one of the n websites is determined to be a result of an HSTS flag in the HSTS cache of the web browser 116. The identity server 140 thus provides a bit value of "1" for each of the bit number(s) of the DID code associated with those website(s) receiving such requests via HTTPS. For any such corresponding request from the web browser 116 that is performed via unsecure HTTP (or not via HTTPS) to the n websites, the identity server 140 may conclude there is no HSTS cache entry in the requesting web browser 116 that associates an HSTS flag and the corresponding website. The identity server 140 may thus provide a bit value of "0" for each of the bit number(s) of the DID code 117 associated with those website(s) receiving such requests via unsecure HTTP. The identity server 140 may thus obtain the DID code 117 in full after all n websites receive an access request from the web browser 116.

Figure 4A:
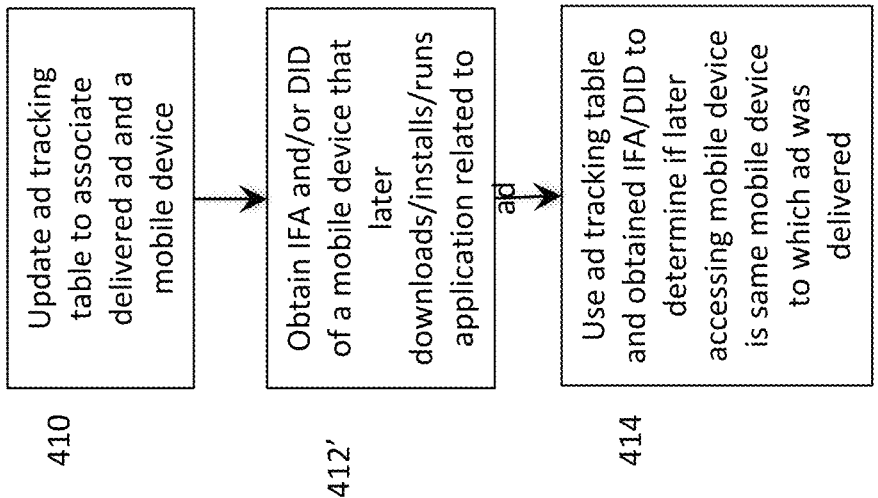

FIG. 4A illustrates one example of ad tracking that may be performed as part of step 218. In step 410, an ad tracking table is updated in to associate an advertisement with a mobile device in response to delivering an advertisement to web server 130 (e.g., for subsequent delivery to the accessing mobile device 110 as performed in step 216). An exemplary ad tracking table 154a is illustrated in FIG. 2B. The following description refers to the ad tracking table 154a being stored and updated by ad server 150, however, the ad tracking table 154a may be stored and maintained elsewhere, such as with identity server 140 (e.g., when identity server 140 both obtains a corresponding IFA 113 in response to an obtained DID 117—either directly from the mobile device 110 or from a web server (e.g., 130)—and using the obtained IFA 113 to obtain and provides the advertisement to the mobile device 110). In this example, the ad server 150 updates the ad tracking table 154a to add an entry (a row in the exemplary ad tracking table 154a of FIG. 2B) to associate the delivered advertisement to the accessing mobile device 110 as identified by its IFA 113 and/or DID 117. For example, the ad server 150 may store in an entry of an ad tracking table 154a stored in database 154 (and thereby associate) one or more of an advertisement id (e.g., a unique id identifying the advertisement), the date and/or time of delivering the advertisement, the IFA 113 of the accessing mobile device 110, the DID 117 of the mobile device 110, and a vendor id identifying the vendor associated with the delivered advertisement.

After delivery of the advertisement to the accessing mobile device 110, and the associated updating of the ad tracking table 154a, the IFA and/or DID of a mobile device accessing a website is obtained (step 412). If the same mobile device 110 accesses a vendor web page 182 that is associated with the advertisement (e.g., the vendor associated with the vendor id), the IFA 113 and/or DID 117 may be obtained from the mobile device 110 (as described with respect to steps 204 to 214) by the vendor server 180.

In step 414, the ad tracking table 154a and obtained IFA/DID are used to determine if the later accessed web page in step 412 is the same as the mobile device to which the ad was delivered (in connection with step 410). Specifically, the IFA 113 and/or DID 117 of the mobile device 110 accessing the vendor web page 182 (obtained in step 412) may be compared with those stored in the ad tracking table 154a (step 410) to find any matches and thereby determine the effectiveness of the advertisement. For example, when the IFA 113 and/or DID 117 of the mobile device 110 accessing the vendor web page 182 matches those in an entry of the ad tracking table 154a and the vendor id in that entry is associated with the vendor web page 182, the vendor may conclude that the associated advertisement (as identified by the advertisement id in that entry) was successful. The difference of the time of the delivery of the advertisement and the time of the same mobile device 110 accesses the vendor web page 182 may also be analyzed to determine the effectiveness of the associated advertisement.

It should be appreciated that such an ad tracking table 154a may be created and stored for a particular vendor, such as on vendor server 180. Also, more or less information may be tracked. For example, advertisement ids may be associated with later accessed web pages (e.g., 182) and a vendor id need not be stored. For example, identifying the mobile device 110 by its IFA 113 may be sufficient for ad tracking purposes and a DID 117 need not be stored by the ad tracking table 154a (or alternatively, only the DID 117 may be stored and the IFA 113 need not be stored).

Figure 4B:
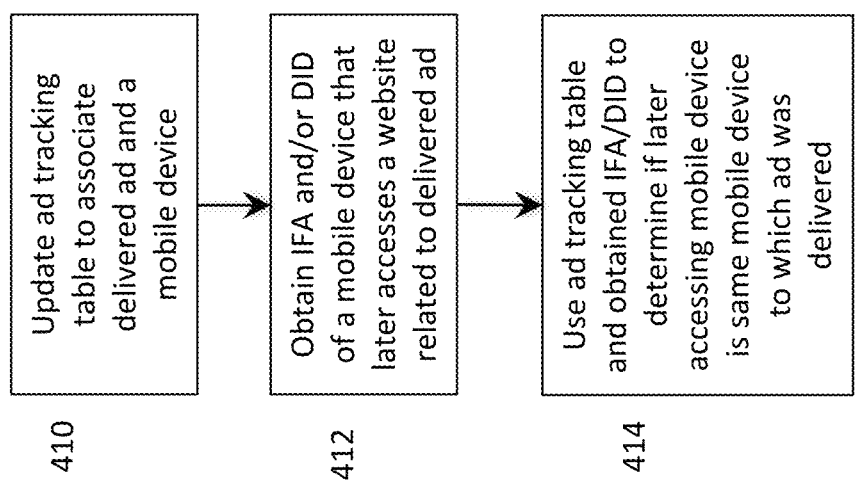

FIG. 4B illustrates another example of ad tracking that may be performed as part of step 218 (in addition to or instead of those described with respect to FIG. 4A). Steps 410 and 414 may be the same as that described with respect to FIG. 4A. In this example, the ad tracking table 154a may be used to identify advertisements responsible for user downloads of applications 114 on a mobile device 110. For example, in step 412' mobile devices 110 that download and install a vendor's application 114 may provide their IFA 113 to the vendor server 180 or ad server 150. As part of a purchase or download of an application, or as part of the installation of an application 114 on a mobile device 110, or the running of an application 114 on a mobile device 110, the mobile device 110 may be instructed by the application 114 to provide its IFA 113 to this server (e.g., 180, 150). In addition, or alternatively, this server (180, 150) may obtain the DID 117 of the mobile device 110 (as performed in step 210) and send a request to the identity server 140 to obtain the corresponding IFA 113 from look-up table 154a of identity server 140 (as described herein). Such provision of the IFA 113 and/or DID 117 may be performed upon execution of the SDK 115 as part of the installation and/or running of the downloaded application 114.

The thus obtained IFA 113 and/or DID 117 may then be compared to those in the ad tracking table 154a to determine if there is a match (step 414). For example, when the ad tracking table 154a is maintained in the database 154 of the ad server 150, a vendor server 180 may obtain an IFA from an application 114 as part of running the application 114 on a mobile device, and provide the obtained IFA 113 (and/or DID 117) to the ad server 150 (e.g., SDK 182a may be responsible for providing the obtained IFA 113 and/or DID 117 to the ad server 150 when such information is provided to vendor server 180). Ad server 150 may then perform analysis to determine if there is match between the IFA 113 received from the vendor server 180 and an entry in the ad tracking table 154a including this IFA 113 in a field of the entry. Determining that a match exists may require both matching of the IFA 113 and/or DID 117 with an entry in the ad tracking table 154a as well as confirming that the matching entry in the ad tracking table 154a contains a vendor id associated with the vendor associated with the downloaded application (which may be the same as the vendor of the vendor serve 180). Results of this analysis may be communicated to the vendor (e.g., from the ad server 150 to the vendor server 180). If a match is found, the vendor may conclude the advertisement (identified by the advertisement id in the ad tracking table 154a) provided to the corresponding mobile device 110 was successful. The difference of the time of providing the advertisement (optionally stored with the entry in the ad tracking table) and the time the downloaded application 114 provides the IFA and/or DID 117 of the mobile device to the vendor's server 180 may also be analyzed to determine the effectiveness of the advertisement.

In step 214 of FIG. 4A and FIG. 4B, correlating the later accessing mobile device to the delivered ad may be performed after correlating the IFA 113 and DID 117 of a particular mobile device. For example, ad tracking table 154a may only store a DID 117 and leave an IFA field empty, such as done for the entry having device DID "AB99" in the exemplary ad tracking table 154a of FIG. 2B. Similarly, the ad tracking table 154a may include entries having no data for the device DID field and only the IFA 113 entered (in the device IFA field). Later, the IFA 113 may be obtained and associated with the DID 117 of a particular mobile device 110 and the ad tracking table 154*a* may be updated and analyzed to correlate the actions of a later accessing mobile device (e.g., purchase, vendor website access, signing up, etc.) with the delivered ad. Such actions of an accessing mobile device 110 may also be stored and correlated with one or more of the IFA 113 and DID 117 of the accessing mobile device 110, such as by a vendor upon the later interaction with the mobile device (e.g., vendor website 182 access by the browser 116 of the mobile device 110), where the IFA 113 and/or DID 117 are obtained by the vendor server 180 as described herein.

Figure 2D:
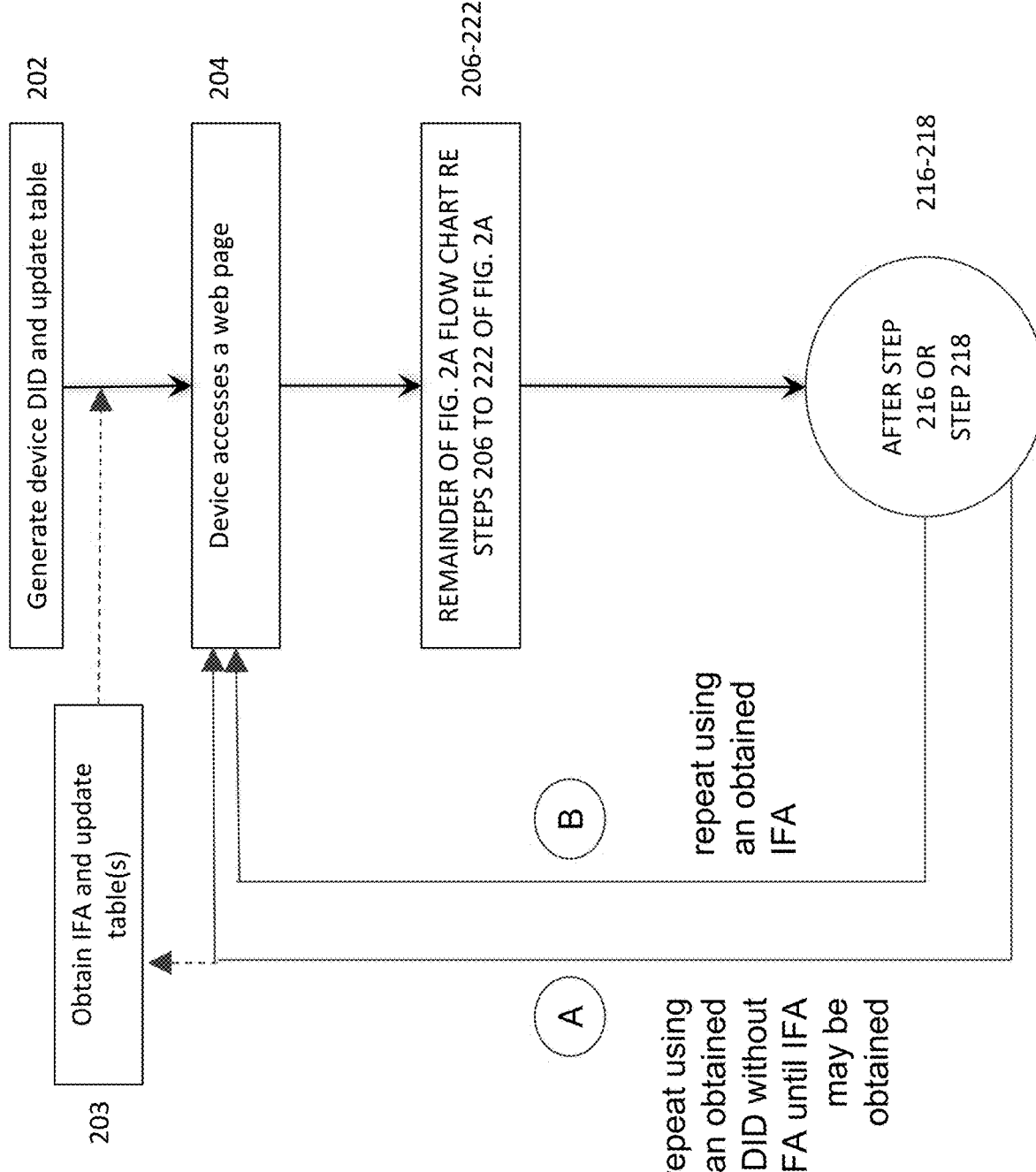
FIG. 2D illustrates an exemplary implementation of repetitively performing the method of FIG. 2A.

FIG. 2D illustrates exemplary repetition of the method of FIG. 2A with respect to a particular accessing mobile device 110. Although the processes of FIG. 2D are described with respect to particular mobile device 110, it will be understood that multiple different mobile devices 110 implement the process and be configured to implement the process of FIG. 2D. The flow chart process of FIG. 2A is duplicated in FIG. 2D, although all the steps of FIG. 2A are not explicitly illustrated in FIG. 2D. Specifically, the process of FIG. 2D illustrates steps 202 and 204 of FIG. 2A and represents the remaining steps 206 to 222 and possible sequences (including optional implementations and alternatives) as box 206-222. Node 216-218 of FIG. 2D represents the process of FIG. 2A after performing either step 216 or step 218 (as noted herein, like other exemplary steps or portions thereof described herein, step 218 is optional). After performing step 216 or step 218, the process of FIG. 2A may be repeated, starting at step 204 when the web browser 116 of the accessing device performs another access of a web page 132 (which may be the same or different from web pages 132 previously accessed). The generation of a device DID 117 need not be repeated unless it is determined that the mobile device no longer has a device DID (which may be determined as part of the web browser's execution of the script downloaded from the newly accessed web page).

The method of FIG. 2D thus comprises repeatedly performing the process described with respect to FIG. 2A starting at step 204 and ending at step 216 or 218 (e.g., repeating Loop A and/or Loop B of FIG. 2D). The initial step of FIG. 2D comprises generating the device DID and updating look-up table 144*a* as described herein with respect to step 202. As described herein, step 202 may be performed by generating the DID 117 by executing script on a browser 116 where the script is provided to the browser 116 by a web page. In this instance, the IFA 113 may not be available as the web browser 116 may not be configured to obtain the IFA 113 of the mobile device 110. Loop A of FIG. 2D represents the process of FIG. 2A as executed by the system and devices thereof when an IFA 113 of the accessing mobile device 110 has not yet been obtained. Loop A may be repeated for each access of a web page (which may be different web pages 132 hosted by different web servers 130 or other servers) by mobile device 110.

As also described herein, step 202 may be performed by generating the DID 117 by executing SDK 115 providing with application 114. In such an instance, the SDK 115 may operate to obtain the IFA 113 of the mobile device 110. In this instance, the process of FIG. 2D/FIG. 2A may continue by obtaining and using the IFA 113 as described herein. Such process may be repeated for each subsequent access of a web page 132 by the web browser 116 of the accessing mobile device 110 (again, each such accessed web page 132 need not be the same web page 132 and may be different from each other). Loop B of FIG. 2D represents the repeated process of FIG. 2A as executed by the system and devices thereof when an IFA 113 has been obtained and associated with a DID 117 (e.g., in look-up table 144*a*).

It will be appreciated that although Loop A of FIG. 2D comprises step 204 and the remainder of the flow chart of FIG. 2A as it pertains to steps 206-222, only some of steps 206-222 may be implemented in any one pass of executing the method of FIG. 2A (and thus FIG. 2D), as described herein, and further, that some of steps 206-222 may be omitted entirely from the implementation of the method of FIG. 2A (and thus FIG. 2D), as described herein.

In addition, FIG. 2D may be implemented by first implementing Loop A one or more times (without having obtained an IFA 113 from the mobile device 110), then obtaining an IFA from the mobile device 110 in step 203, and then repeating Loop B after obtaining the IFA 113 in step 203. In this instance, when implementing Loop A, look-up table 144*a* may be updated in step 202 to only include the DID 117 and ad tracking table 154*a* may be updated in step 218 to add entries without providing an IFA 113 in the IFA field of the entry (although such entries may include a DID 117). For example, entries associated with DID 117 having a code of AB99 in ad tracking table 154*a* (FIG. 2B) and look-up table 144*a* (FIG. 2C) have no value entered in the field provided for the IFA in these tables (alternatively, a predetermined code, such as "FFFF" or a flag bit of the entry may indicate the lack of an IFA for a particular entry in table 144*a* and/or 154*a*). After accessing one or more web pages 132 (e.g., at step 204) and performing loop A one or more times, the mobile device may execute SDK 115 in an application 114, as described herein with respect to step 202. Upon executing the SDK 115, the IFA 113 of the mobile device 110 may be obtained and both the newly obtained IFA 113 and the previously obtained DID 117 may be provided to identity server 140 to update the look-up table 144*a*. In addition, the IFA 113 and the previously obtained DID 117 may be provided to the server or servers maintaining the ad tracking table 154*a* (such as ad server 150 and/or identity server 140). SDK 115 may first check for the existence of a DID stored on the mobile device 110 (e.g., existence of a DID cookie, DID in LocalStorage, and/or communicate with identity server 140, as described herein) so that new DID 117 need not be generated upon determining the existence of the DID 117 within the mobile device 110. At this time, each of the look-up table 144*a* and ad tracking table 154*a* may be updated to add the obtained IFA 113 in the appropriate IFA field of the entries of these tables having the DID 117. Thus, although initial operations of Loop A may be unable to identify a mobile device 110 by its IFA 113, later actions of the mobile device 110 may allow the IFA 113 to be obtained and associated with earlier performed actions of the mobile device 110.

Figure 5:
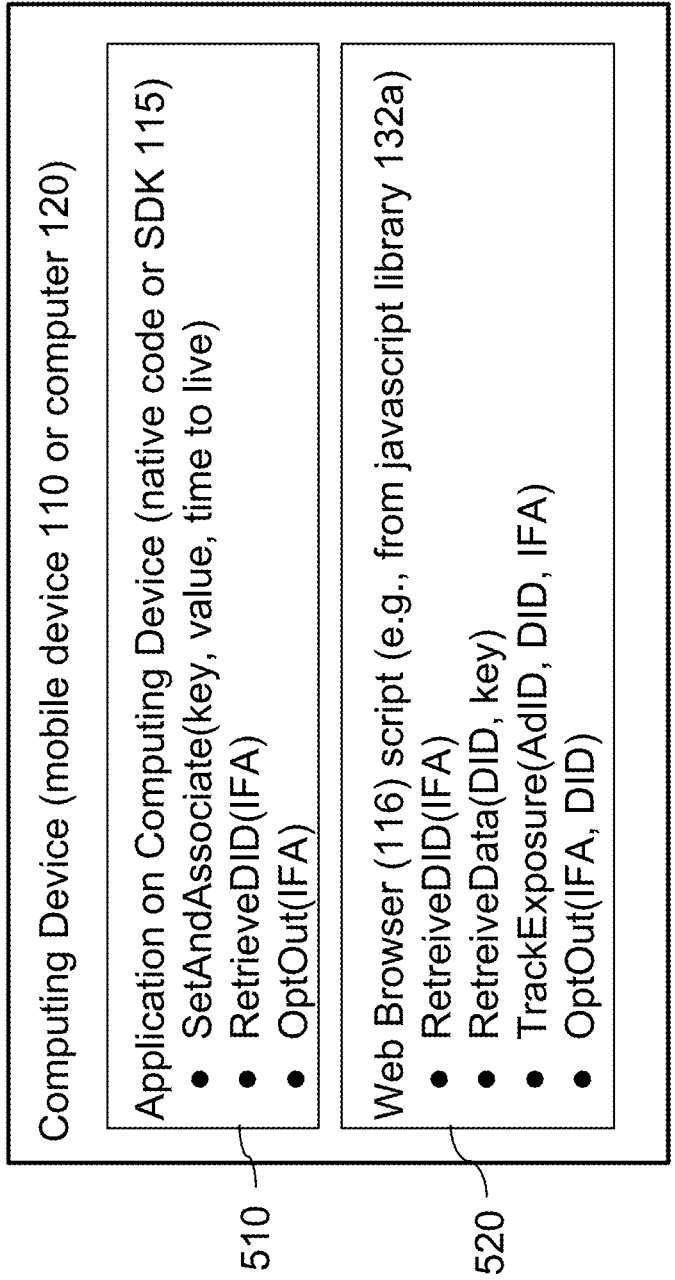
FIG. 5 illustrates exemplary calls to software routines to perform various aspects of the steps of described with respect to FIGS. 2A-2D, 3A-3E, 4A and 4B.

FIG. 5 illustrates exemplary calls to execute software routines 510 and 520 a computing device, such as the mobile device 110 or computer 120, may be configured to perform. Software routines 510 and 520 may be executed by the device 110, 120 as part of performing the methods described herein, e.g., with respect to FIGS. 2A-2D, 3A-3E, 4A and 4B, and thus the exemplary details described with respect to these figures may not be fully repeated below but should be considered applicable to these software routines 510, 520. Software subroutines 510 may be provided by a downloaded application 114 on the mobile device 110 and be embedded in the application 114 as SDK 115. The SDK 115 of application 114 may include several APIs (application programming interfaces) represented in FIG. 5 as calls "SetAndAssociate(key, value, time to live)," "RetrieveDID(IFA, DID)," and "OptOut(IFA)." Software subroutines 520 may be provided to the device 110, 120 and configure the web browser 116 of the device 110, 120. The subroutines 520 may be obtained from a JavaScript™ library (e.g., LIB.js 132*a*) upon the device 110, 120 accessing a web page (e.g., 132) providing the script 132*a* of the JavaScript™ library. The script obtained by the device 110, 120 may include several software routines associated with calls "RetrieveDID(IFA, DID)," "RetrieveData(DID, IFA)," "TrackExposure(AdID, DID, IFA)" and "OptOut(IFA, DID)."

Upon execution of SetAndAssociate(key, value, time to live) of 510, the variable name passed with the field "key" is associated with a code "value". For example, SetAndAssociate "IFA", value, time to live) causes the computing device (e.g., either mobile device 110 or other computer device 120, referenced generically as "110, 120") to obtain the code associated with variable "IFA" of the device 110, 120 from the OS of the device 110, 120 (e.g., causing a request to the OS for the IFA code via an API of the OS) and send the same to identity server 140; determine if a DID 117 is stored on the device 110, 120 (as described herein, e.g., by causing web browser 116 to identify any DID cookie stored in a cache of the web browser 116 and/or analyzing data stored in the LocalStorage cache of the web browser 116 and/or causing the identity server 140 to analyze web site accesses of the device 110, 120); if a DID 117 is found to have been previously stored on the device, this DID 117 is obtained by the identity server 140 (as described herein, e.g., either by transmission from the device 110, 120, through monitoring web site accesses of the device 110, 120, etc.); if a DID 117 is not found to have been previously stored on the device, a new unique DID code 117 is obtained by server 140 and stored on device 110, 120 (e.g., as described herein); server 140 having been provided the IFA 113 and a DID 117 (previously stored or newly obtained) of device 110, 120, associated the same (e.g., by storing the same as IFA 113 and DID 117 in look-up table 144*a*). The actions described herein regarding the SetAndAssociate API may be performed after checking for whether the device 110, 120 has opted out or not, as described herein. It should also be appreciated that the identification of the variable name passed with the key field of the SetAndAssociate command may be "UIDH" (as identified by an iOS 112 in an Apple™ iPhone™) to identify the IFA 113 of an Apple iPhone, such as described herein. In other implementation, values of other variables may be associated with the SetAndAssociate command by passing known variable names rather than those associated with an IFA.

Upon execution of RetrieveDID(IFA) of 510, the device 110, 120 obtains its DID 117 by providing this request with the IFA code (the IFA code first having been obtained from a request to the device OS) to the identity server 140. The identity server 140 in response thereto provides the DID code associated with the provided IFA (e.g., as stored in the same entry in look-up table 144*a*).

Execution of OptOut(IFA) of 510 may cause the device 110, 120 to instruct the identity server 140 to identify the device associated with the IFA transmitted to the server 140 as opted-out and to perform cleanup actions as described herein.

Execution of RetrieveDID(IFA) of 520 obtains the DID 117 of the device 110, 120. If the DID 117 is available in a DID cookie or in LocalStorage, the web browser 116 of the device 110, 120 may obtain the DID 117 (which may or may not require communication with server 140, such as requesting decryption of an encrypted DID found in a DID cookie or in LocalStorage). If available (such as in a IFA cookie), the IFA 113 may be passed to the server 140 so that the web browser 116 may obtain the DID 117 from the identity server 140 (via look-up table 144*a*, e.g.). If no IFA or DID is found from information read from a cache of the web browser 116 (e.g., storing a cookie or LocalStorage) is found on the device 110, 120, the RetrieveDID subroutine of 520 may then request the identity server 140 obtain the DID 117 (e.g., by monitoring web site accesses of the device 110, 120) and return the DID 117 value in response thereto (as described herein). In some examples, the web browser 116 may be unable to obtain the IFA 113 from the OS 112. In addition, RetrieveDID(IFA) of 520 may be used as part of SetAndAssociate of 510 as a command to cause the DID 117 to be obtained by server 140 monitoring accesses of web sites of the server 140 by the device 110, 120.

Execution of RetrieveData(DID, key) of 520 may provide a RetrieveData request to identity server 140 to cause the identity server 140 to identify the IFA 113 associated with the DID passed to the server 140 with the RetrieveData request from the device 110, 120 (or a DID 117 otherwise obtained by the server 140). The identified IFA 113 may be returned to the device 110, 120 or used by the identity server 140 as part of an ad call from the web browser 116 (and the IFA 113 obtained by RetrieveData(DID, key) need not be returned to the device 110, 120).

Execution of TrackExposure(AdID, DID, IFA) of 520 subroutine may cause an identification code (AdID) received with an advertisement being received and rendered by the web browser 116 to be sent to an external server (e.g., identity server 140 or ad server 150 containing an ad track table, such as 154*a*) along with the DID 117 and/or IFA 113 of the device 110, 120. Such a TrackExposure request from the device 110, 120 to the external server (e.g., identity server 140) may cause updating of the ad tracking table 154*a* to store this information in an entry of the ad tracking table 154*a*. Date and Time may also be added to this entry, either based on the time of receiving the TrackExposure request by the server, or by sending date and time associated with the receipt and rendering of the advertisement by the web browser 116 with the TrackExposure request. As noted herein, in some implementations, only one of the IFA 113 and DID 117 need be sent and the other of the IFA 113 and DID 117 may be obtained from look-up table 140 from identity server 144*a*.

Execution of OptOut(IFA, DID) of 520 causes an OptOut request to be sent to identity server 140 with one or both of the IFA 113 and DID 117, to thereby cause identity server 140 to update the look-up table 144*a* to associate the device 110, 120 as being opted out and perform any cleanup actions as described herein.

In further examples, the system of FIG. 1 may be configured to perform fraud detection. Fraud detection may be performed instead of steps 216 and 218 or in addition to step 216 or both of steps 216 and 218 in FIGS. 2A/2D. For example, an application 114 of a mobile device embedded with SDK 115 may be configured to execute the SetAndAssociate subroutine described herein upon any initial execution of the application 114 or periodically during the execution of the application 114 (e.g., every 10 minutes, every hour, etc.). The SetAndAssociate request from the device 110, 120 thereby provides both the IFA 113 and the DID 117 of the device 110, 120 and updates look-up table 144*a*. Optionally, if an entry already exists in the look-up table 144*a* associating IFA 113 and DID 117, updating the look-up table 144*a* may be skipped and the SetAndAssociate subroutine terminated. Alternatively, an entry may be added to the look-up table 144*a* even if a previous entry associating the obtained IFA 113 and DID 117 exists. In some implementations, the entries may be identical or may differ based on other information stored in additional fields of the entry (and received with the SetAndAssociate request, such as time of receipt of the SetAndAssociate request and an application ID (unique to application 114 to identify application 114 containing the SDK 115 which executed the SetAndAssociate call to generate the SetAndAssociate request received by identity server 140).

The look-up table 114a of may later be analyzed to examine all entries having the same DID code. For these entries, if the associated IFA 113 is different for the same DID code, and the IFA 113 is altered to a different IFA 113 at a frequency above a certain threshold (e.g., more than once every hour or altered every time the application 114 is run), it may be determined that the device 110, 120 is associated with fraud. For example, application developers may receive revenue upon determining that an application was downloaded onto a device 110, 120, which is often determined only upon running of the application 114 associated with a new IFA (previously unassociated with running of the application). As the IFA of a device 110, 120 may be changed by a user, credit for a newly downloaded application 114 may erroneously be given to a developer. While this may occur infrequently (and thus be acceptable) for typical IFA modification by a typical user, higher frequency alterations of the IFA (as may be detected with this implementation) indicate abnormal usage of the device 110, 120 and may be associated with fraud.

Figure 6:
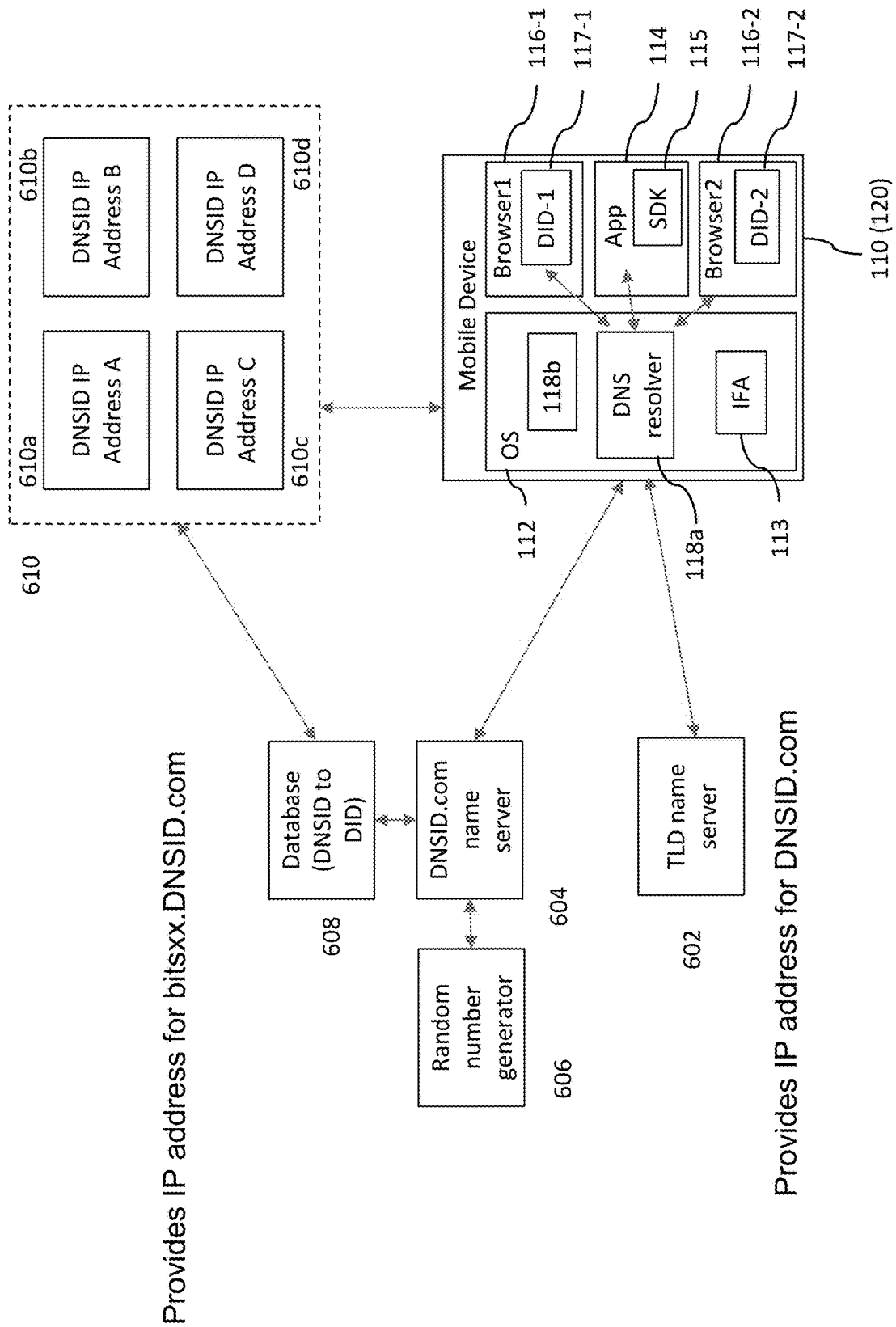
FIG. 6 illustrates a system according to some embodiments.

FIG. 6 illustrates a further embodiment that may be used in conjunction with the previously described embodiments. In FIG. 6, mobile device 110 or another type of computer (generically listed as 120) is a user device having various communications with servers over the Internet (e.g., as discussed herein, such as with respect to FIG. 1). Such communications are represented by the arrows between the device 110 (120) and various servers referenced as 602, 604 and 610. Although the following discussion will refer to the mobile device 110 as the user device (also may be referred to as a client device) communicating with various severs over the Internet, it will be understood that the description is equally applicable to other types of computers (e.g., as discussed herein with respect to computer 120).

Specifically, server 602 represents a conventional top level domain (TLD) name server (a domain name system or "DNS" server) that may be accessed to provide an IP address of a particular subdomain within a top level domain (e.g., within the top level domain.com). Server 604 is a DNS server for a particular domain, in this example for the domain DNSID.com. Server 604 may be referred to as DSNID.com name server. In this example, TLD name server 602, when queried, may return an IP address of DNSID.com name server 604. DNSID.com name server 604 may then be queried to obtain the IP addresses of subdomains within DNSID.com. Such subdomains within the DNSID.com domain may comprise hostnames, where each hostname is associated with an IP address that identifies a host computer (such hostnames are also called domain names and may be a fully qualified domain name (FQDN)). In this example, DNSID.com name server 604 may provide an IP address for each of the following 32 hostnames in response to a corresponding DNS lookup query to the DNSID.com server 604: bitgroup1.DNSID.com, bitgroup2.DNSID.com, . . . bitgroup32.DNSID.com.

Reference number 610 represents one or more servers configured as one or more host computers that may be accessed over the Internet. Server(s) 610 may be embodied by identity server 140 described herein or may be a different web server(s) that may be in communication with identify server 140 to exchange and correlate information collected by servers 140 and 610 (e.g., IFA, DID, DNSID, Vendor ID, Ad ID, etc.). One or more servers 610 are associated with a plurality of different public IP addresses 610a, 610b, 610c and 610d, such as IPv4 (Internet Protocol version 4) or IPv6 (Internet Protocol version 6) addresses. Reference herein to IP addresses will be understood to refer to public IP addresses unless context indicates otherwise. Each public IP address is a numerical value. For example, an IPv4 IP address is a 32-bit integer value that is often represented by four decimal numbers separated by periods, such as "192.168.73.2"). As is conventional, each of the public IP addresses may be used by routers of the Internet to provide a communication link between a client device (e.g., mobile device 110) and to a host computer associated with the public IP address. For example, each public IP address 610a, 610b, 610c and 610d may each identify a corresponding different server, so that reference labels 610a, 610b, 610c and 610d may each also represent a different server (a different host computer) associated with a different public IP address. Alternatively, each public IP address 610a, 610b, 610c and 610d may identify the same server (the same host computer) in which case 610 may represent a single server (and a single host computer). It will be recognized that other configurations are possible, such as plural servers that each are identified by plural public IP addresses. Reference to "server(s) 610" herein is used to refer to one or more servers and will be used to generically reference each of these possible configurations of 610.

FIG. 6 also illustrates a random number generator 606 and database 608 in communication with DNSID.com name server 604. Although shown separate from the DNSID.com server 604, the random number generator 606 and the database 608 may be part of the DNSID.com name server, such as being embodied within the same computer forming the DNSID.com name server 604. For instance, the random number generator 606 may comprise a software module that configures the computer hardware of the DNSID.com name server 604 to generate a random number and the database 608 may comprise a storage medium (i.e., memory) of the DNSID.com name server 604.

Alternatively, random number generator 606 and database 608 may be formed separately from the DNSID.com name server 604 such as on a different computer/storage medium in communication with the DNSID.com name server 604 via a local area network or in communication with the DNSID.com name server 604 over the Internet. In some examples, one or both of the random number generator 606 and database 608 may be formed by configuring other servers described herein, such as being modules of identity server 140. The following description will refer to the DNSID.com name server 604 as being separate from the random number generator 606 and database 608 for ease of explanation of their roles, but it will be understood that, unless context indicates otherwise, such description applies to each of the described possible implementations the random number generator 606 and database 608 (e.g., as part or not part of DNSID.com name server 604) and should not be interpreted as being limited to a particular configuration. More particularly, unless otherwise specified, reference to the DNSID.com name server 604 in communication with the random number generator 606 and database 608 should be understood to include communications between modules (including the same hardware configured by software) of the same server or same computer as well as between different hardware.

FIG. 6 also illustrates mobile device 110 having several web browser applications, including Browser1 116-1, Brower2 116-2 and application 114 (application 114 being an application other than a web browser application). The web browsers 116-1 and 116-2 may each have the functionality and configurations as described herein with respect to web browser 116. Application 114 may have the same functionality and configuration as described elsewhere herein. Although only two web browsers 116-1, 116-2 and one application 114 are shown in FIG. 6, it will be appreciated that additional web browsers and applications 114 may be provided with and configure the mobile device 110.

The web browsers Browser1 116-1 and Browser2 116-2 are each shown to include a durable IDs DID-1 117-1 and DID-2 117-2 respectively. Each of these DIDs 117-1, 117-2 may be the same as DID 117 described herein, and generated and used the same by each respective browser as described herein. It should be appreciated that the web browsers Browser1 116-1 and Browser-2 may not be able to access the information (including caching information in LocalStorage and cookies) of other web browsers on the mobile device 110. In addition, it should be appreciated that each of the web browsers Browser1 116-1 and Browser-2 may be configured to generate and store a durable ID (here, DID-1 117-1 and DID-2 117-2) independently of the other (and any other browsers of the mobile device 110) and thus the durable ID's DID-1 117-1 and DID-2 117-2 may have different code values. Each web browser 116-1, 116-2 may have their own HSTS cache and own durable IDs DID 117-1, 117-2, which may be stored in the HSTS cache (e.g., by setting HSTS flags in the HSTS cache) and accessed as described herein. The durable IDs DID-1 117-1 and DID-2 117-2 may also be stored in caches of the web browsers 116-1 and 116-2, such as being stored as a DID cookie or in the LocalStorage cache of each web browser 116-1, 116-2 (as described herein with respect to web browser 116). When the DID is stored in a cache of a web browser, such as a DID cookie or in the LocalStorage cache of a web browser, it may be directly accessed by a web server requesting such DID. Although the Browsers 116-1 and 116-2 are each shown to store one DID, the browsers may initially have no DID stored therein. It should also be noted that the DID stored in each of the browsers (e.g., 116-1, 116-2) of the mobile device 110 may be different ID codes or may be the same ID code. Further, it will be appreciated that each of the browsers 116-1, 116-2 may store more than one DID code, as described below.

The mobile device 110 may include one or more applications 114 that access various web pages and/or other web resources hosted by various web servers (although applications 114 are not web browser applications, such as 116-1, 116-2). For example, applications 114 may include an e-mail application that accesses a user's e-mail, or a social media application, that provides news articles, videos, advertisements, etc., by accessing various web servers over the Internet. The application 114 may also include an SDK 115 and include the related functionality as described herein. However, although the application 114 of FIG. 6 is shown with SDK 115, applications 114 may also be provided without the SDK 115.

The operating system (OS) 112 of the mobile device 110 may also have the same functionality and configuration as described elsewhere herein. FIG. 6 also illustrates that OS 112 of the mobile device includes a DNS resolver 118a and a DNS cache 118b. The DNS cache 118b is shown separately from DNS resolver 118a for purposes of explanation, but it will be understood that the DNS cache 118b may be considered part of the DNS resolver 118a and separate reference to these elements should be understood to refer to both of these configurations. The DNS resolver 118a may be formed by configuring computer hardware (e.g., a microprocessor) with software, such as configuring a system on a chip (SoC) having a processor core (such an ARM™ core), where such SoC also embodies the operating system (OS) 12 of the mobile device 110. The DNS resolver 118a may maintain the DNS cache 118b by providing a look-up table or other database entries that associate hostnames with IP addresses identifying a corresponding host computer, such as server(s) 610.

Figure 7:
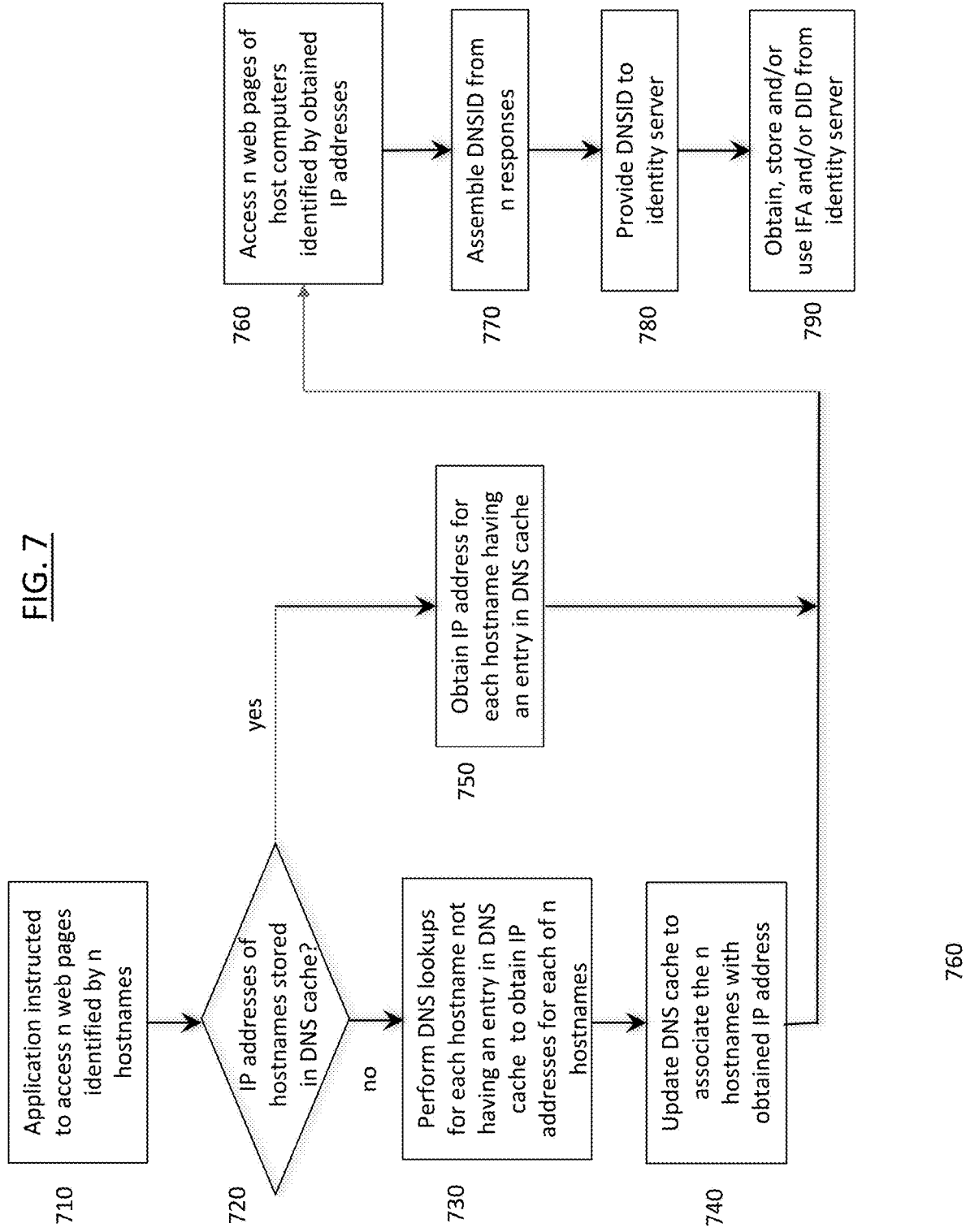
FIGS. 7, 8A, 8B and 8C illustrate steps that may be performed by the system of FIG. 6.
Figure 8B:
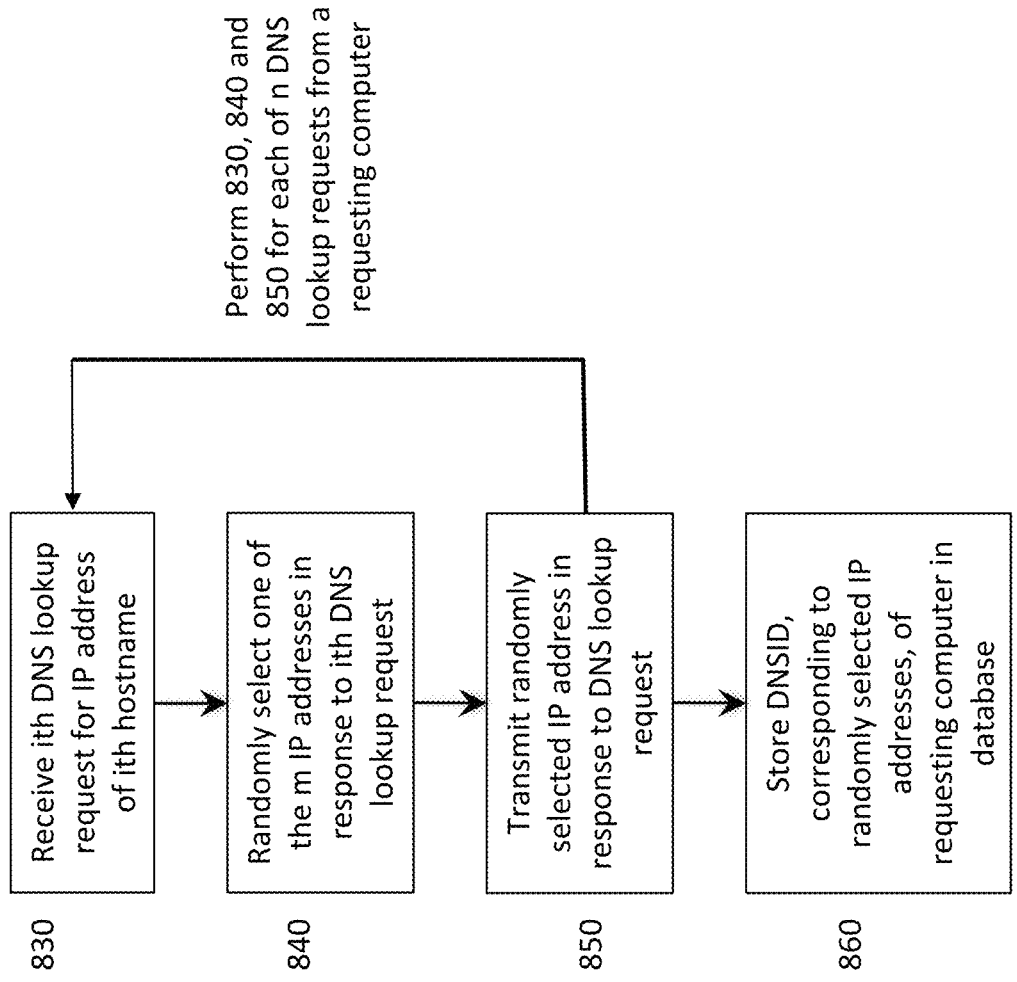
Figure 8A:
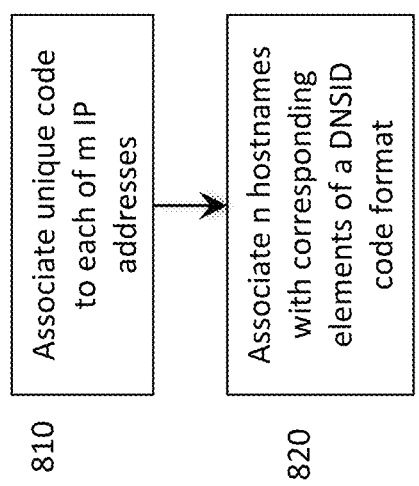
Figure 8G:
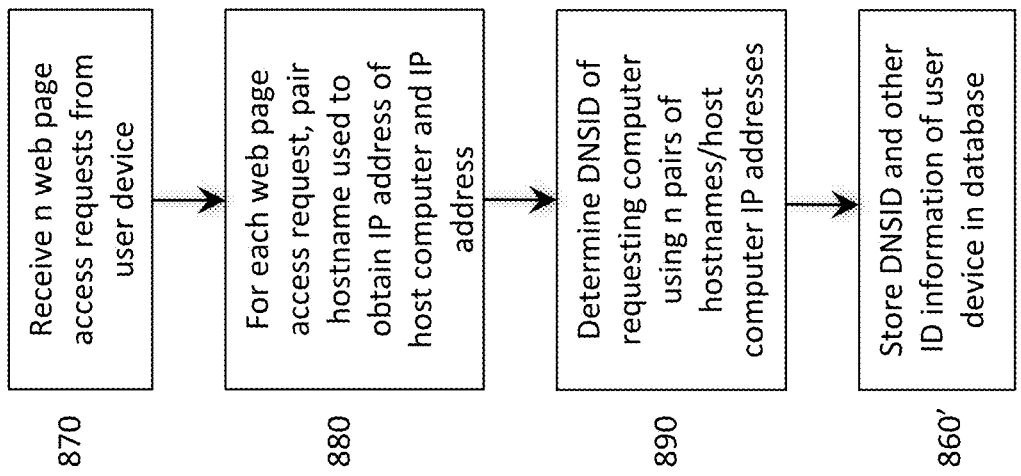
FIG. 8G illustrates an exemplary method that may be performed by one or more server.
Figure 8C:
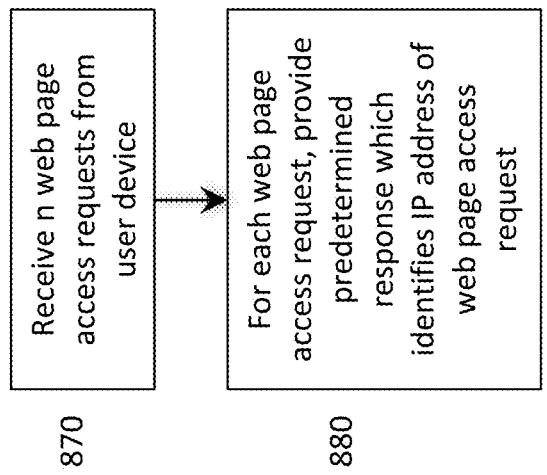

FIGS. 7, 8A, 8B and 8C illustrate steps that may be performed by the system of FIG. 6. FIG. 7 illustrates steps that may be performed by an accessing computer, such as the mobile device 110 of FIG. 6. FIG. 8B illustrates steps that may be performed by the DNSID.com name server 604, FIG. 8C illustrates steps that may be performed by server(s) 610, and FIG. 8A illustrates steps that may be performed by one or both of the DNSID.com name server 604 and by server(s) 610.

Turning to FIG. 7, in step 710, an application of the mobile device 110 (either a web browser application 116 or a non-web browser application 114) is instructed to access n web resources that are identified by n different hostnames (n being a positive integer). The n web resources may be resources stored on a host computer and identified by a URL, and may be accessed by a client (here browser 116-1 or 116-2 of mobile device 110) over the Internet in response to HTTP requests issued by the client ("HTTP requests" should be understood to include requests conforming with an unsecure HTTP protocol as well as secure protocols, such as HTTPS). In this example, the n web resources are referred to as n web pages to facilitate ease of understanding, however, other web resources may be accessed that are not web pages, such as simply accessing a file (which need not be part of a web page). In this example, web browser 116-1 of the mobile device 110 may access a web server that then provides script to the accessing web browser 116-1 providing commands to the web browser 116-1 to cause the web browser to access the following 32 web pages (e.g., n=32 in this example) identified by 32 URL links, each being associated with a different hostname: http://bitgroup1.DNSID.com, http://bitgroup2.DNSID.com, http://bitgroup32.DNSID.com. Such script may be included as part of script 132a and accessed in the same manner as described herein (such as with respect to FIGS. 1-5). Alternatively, application 114 may include an SDK 115 that instructs the application to access these 32 web pages. SDK 115 may be the same SDK as described elsewhere herein and include the same functionality (such as with respect to FIGS. 1-5). It will be appreciated that the hostnames of these URL links (e.g., "bitgroup1.DNSID.com") share the same domain name "DNSID.com" and differ by the subdomain subordinate to the domain "DNSID.com" (in this example, the hostnames differ based on their local hostname (the leftmost label of the hostname in the URL links The application (e.g., 114, 116-1 or 116-2) communicates with the OS 112 to initiate access of these 32 web pages, providing the hostnames of the 32 URL links to the OS 112. Note that these 32 web pages/web resources may not be the same web pages/web resources as described herein to generate a device DID (such as with respect to step 202 of FIG. 2A) and further, that the number of web pages/web resources to be accessed in step 710 may differ from the number of web pages/web resources accessed in step 202 in generating the DID (i.e., the integer "n" may be different values for steps 710 and 202).

Upon receiving the requests and the hostnames of the 32 URL links to access the 32 web pages, in step 720, the DNS resolver 118a of the OS 112 first accesses the DNS cache 118b to determine if the DNS cache 118b has stored therein the IP addresses of the 32 hostnames of the 32 web pages (i.e., IP addresses for any of the hostnames bitgroup1.DNSID.com, bitgroup2.DNSID.com, bitgroup32.DNSID.com).

For each hostname having an entry in the DNS cache 118b, the IP address associated with the hostname is obtained by the DNS resolver 118a (step 750). For each hostname not having an entry in the DNS cache 118b, the IP address is obtained by the DNS resolver 118a by performing a DNS lookup (step 730). For example, the DNS resolver 118a may send a request for the IP address of the DNSID.com name server 604 to TLD name server 602. The TLD name server 602 may return an IP address of the DNSID.com name server 604. The IP address of the DNSID.com name server 604 may then be used by the DNS resolver 118a to obtain the IP address of a hostname of the DNSID.com domain (e.g., obtain the IP address of hostname bitgroup1.DNSID.com). For each IP address obtained by the DNS resolver 118a from the DNSID.com name server 604, the DNS resolver 118a updates the DNS cache 118b in step 740 to associate the obtained IP address with the corresponding hostname (e.g., such as by adding an entry to the DNS cache associating the IP address numerical value and the hostname (e.g., in text format).

In this example, when the DNS cache 118b does not include any of the hostnames (in step 720), the DNSID.com name server 604 may provide an IP address for each of the following 32 hostnames in response to a corresponding DNS lookup query to the DNSID.com server 604: bitgroup1.DNSID.com, bitgroup2.DNSID.com, bitgroup32.DNSID.com. The DNS cache 118b may then be updated (in step 740) to add 32 entries associating these 32 hostnames with the corresponding IP address provided by the DNSID.com name server 604. If later, the 32 web pages associated with these 32 hostnames are to be accessed again, the hostname IP addresses for accessing such web pages may be obtained from the DNS cache 118b (step 750).

After obtaining the IP addresses associated with the hostname (either via step 730 or step 750), the user device (e.g., mobile device 110) may perform a web page request associated with each of the 32 URLs and the IP addresses obtained for the hostnames of each URL to access a corresponding host computer step 760 using the obtained IP address, and more particularly, to access a web page of a corresponding host computer in each such web page access. Each of these 32 web page accesses may be in the form of a web page access request from the user device (e.g., mobile device 110) identifying the server(s) 610 associated with the obtained IP address.

In step 770, the user device (e.g., mobile device 110) receives n responses from the host computers accessed by each of the n web page access requests issued by the user device. The n responses are predetermined and unique to the IP address identifying the host computer. In this example, the responses comprise a code unique to the IP address identifying host computer of the web page access request (e.g., one of the unique codes associated in step 810 described below). For example, if server(s) 610 comprise four servers 610a, 610b, 610c and 610d, each server provides the same predetermined response to the user device (e.g., mobile device 110) in response to a web page access request identifying such server as the host computer. For example, servers 610a, 610b, 610c and 610d provide code responses of "A" "B" "C" and "D" respectively. Such responses may also be provided when server(s) 610 is a single server associated with all of the IP addresses DNSID IP Address A, B, C and D (or otherwise comprise a server being identified as a host computer by more than one of these IP addresses). Alternatively, numerical values may be provided instead of characters "A" "B" "C" and "D" such as the binary values of 00, 01, 10 and 11 (e.g., as discussed below regarding FIG. 8F). For ease of explanation, the continued reference to characters "A" "B" "C" and "D" will be made as the exemplary responses, but it will be understood that numerical responses (that do not represent ASCII characters) may also be made (such as multi-digit binary values).

The codes provided with the responses from server(s) 610 may be provided in a variety of forms. For example, a code may be provided as a pixel value of image file as part of an HTML document returned in response to a corresponding web page access request. As another example, a script (such as JavaScript™) may be provided having a value representing the code (where the script may be part of an accessed web page (e.g., an accessed HTML document) or a file of a web resource not associated with a web page). In step 780, the DNSID obtained by the user device (110, e.g.,) is provided to identity server 140. As with the DID described herein (such as with respect to FIG. 2A), the identity server 140 may use the DNSID to obtain other identifying information about the user device in step 790, such as the IFA and/or a DID of the user device, which may then be used by the identity server 140 or the user device (110). For example, the IFA and/or DID obtained by the user device may be used as described with respect to steps 216 and/or 218 in FIG. 2A, such as for ad calls, ad tracking and/or fraud detection. Steps 770, 780 and 790 may be performed by the application (114 or 116) executing script obtained/providing as described with respect to step 710.

FIG. 8A illustrates a method of operation of the system illustrated in FIG. 6 according to one embodiment of the invention. The method of FIG. 8A may be performed, e.g., by the DNSID name server 604, by server(s) 610 or some other server, such as identity server 140 of FIG. 1. Steps 810 and 820 need not be performed in the sequence illustrated, and may be performed prior to the methods of FIGS. 7, 8B and 8C. In step 810, a different code is associated with each of the m IP addresses, where m is an integer greater or equal to two. In this example, m=4. Each code is unique to each of the m IP addresses so that the same code is not shared among two or more of the m IP addresses. In this example, codes of "A" "B" "C" and "D" are respectively assigned to IP addresses "DNSID IP Address A," "DNSID IP Address B," "DNSID IP Address C," and "DNSID IP Address D." A binary representation of such codes of "A" "B" "C" and "D" may take the form of "00" "01" "10" and "11" for example. Such binary forms may be implemented as the different codes associated with each of the m IP addresses in place of codes "A" "B" "C" and "D," but for ease of explanation, reference will be made to codes "A" "B" "C" and "D". DNSID IP Addresses A, B, C and D may correspond to any IP address that identifies server(s) 610 where each of DNSID IP Addresses A, B, C and D are different from each other.

In step 820, n hostnames are associated with corresponding elements of a DNSID code format, where n is an integer. In this example, n=32 and the n hostnames are bitgroup1.DNSID.com, bitgroup2.DNSID.com, bitgroup32.DNSID.com. The DNSID code format is a format of code to be used to identify a computer, such as mobile device 110. FIG. 8D illustrates an example of a DNSID code format 800 having 32 elements 800-1, 800-2, 800-3, . . . 800-31 and 800-32 each associated with a different hostname (in this example, hostnames bitgroup1.DNSID.com, bitgroup2.DNSID.com, bitgroup3.DNSID.com bitgroup2.DNSID.com and bitgroup32.DNSID.com are respectively associated with elements 800-1, 800-2, 800-3, . . . 800-31 and 800-32 of DNSID code format 800, as identified by their host-specific labels in FIG. 8D). When the DNSID code format is in binary form, each of the n hostnames may correspond to different sets of bit numbers of a DNSID code (e.g., hostnames bitgroup1.DNSID.com may correspond to bit numbers 0 and 1 of the DNSID code, bitgroup2.DNSID.com may correspond to bit numbers 2 and 3 of a DNSID binary code, . . . and bitgroup32.DNSID.com may correspond to bit numbers 62 and 63 of a DNSID binary code).

FIG. 8B illustrates steps that may be performed for each DNS lookup request received by DNSID.com name server 604 associated with any of the n hostnames associated with a corresponding element of a DNSID code format in step 820 of FIG. 8A. In general, it is expected certain implementations that the DNSID.com name server 604 will receive a sequence of DNS lookup requests for each of the n hostnames from a particular computer, such as mobile device 110 (e.g. as described with respect to step 730 of FIG. 7), and the following description will be made in this context for ease of understanding.

In step 830, an ith DNS lookup request is received from a requesting computer for an ith hostname, the ith hostname being one of the n hostnames of step 820 (such as those referenced in connection with the method of FIG. 7), where i is an integer value of one to n. The DNS lookup request is a request from another computer in communication with the DNSID.com name server 604 (e.g., over the Internet) for an IP address (e.g., IPv4 or IPv6 IP address) of the ith hostname, such as described with respect to the method of FIG. 7. The DNS lookup request may be received from a DNS resolver (e.g., 118*a*) of an OS (e.g., 112) of the requesting computer (e.g., 110) in response to a web browser (e.g., 116-1, 116-2) or other application (e.g., 114) executing script to access a web page. The web page may be identified by a URL containing the ith hostname, such as those URLs described with respect to the method of FIG. 7. Although not shown in FIG. 8B, if the DNSID.com name server receives a DNS lookup request for a hostname that is not one of the n hostnames, the DNSID.com name server may respond that the IP address of the hostname is unknown or ignore this lookup request.

In step 840, the DNSID.com name server randomly selects one of the m IP addresses that have been associated with a unique code in step 810 of FIG. 8A. For instance, random number generator 606 may be accessed by the DNSID.com name server 604 to provide the DNSID.com name server 604 with a randomly selected integer of 1 to m. Thus, in this example, the random number generator 606 may randomly select a number of 1 to 4. The random number thus provided may be used to select a corresponding on of the m IP addresses (e.g., a random number result of 1 identifies DNSID IP Address A (610*a*), while random number results of 2, 3 and 4 identify DNSIP Addresses B (610*b*), C (610*c*) and D (610*d*), respectively).

The random number generator 606 may be a software module configuring the DNSID.com name server 604 or may be separate from the DNSID.com name server 604 (e.g., a circuit in communication with the DNSID.com name server or a separate web server that the DNSID.com name server 604 communicates with over the Internet.

In alternative implementations, the DNSID may not be randomly selected as described above, but may be selected from a group of available unassigned DNSID codes (codes not previously selected by the DNSID.com name server and/or not currently assigned to a user device), such as by referencing a lookup table to select a DNSID code identified as not having been assigned. In addition, check codes, such as confirmation codes and ECC codes may also be generated and associated with the DSNID where such codes may later be used to determine an associated code does not correspond to the DNSID associated with the check code or used to confirm that a code likely corresponds to the DNSID associated with the check code. These check codes may be generated and processed in the same manner as the code elements of the DNSID (e.g., may be processed as a portion of the DNSID described herein).

In step 850, the DNSID.com name server responds to the ith DNS lookup request received in step 830 by transmitting the randomly selected IP address to the requesting user device (e.g., mobile device 110) as being associated with the ith hostname. The randomly selected IP address thus identifies a host computer that the user device (e.g., mobile device 110) should access to complete the web page access request associated with the ith hostname (e.g., the web page identified by the URL containing the hostname, as discussed with respect to FIG. 7). The user device (110) may then use the obtained IP address to access, over the Internet, a web page of the host computer identified by the randomly selected IP address, as described with respect to step 760 of FIG. 7.

Steps 830, 840 and 850 are repeated for each of the n DNS lookup requests for each of the n different hostnames of the n URLs. Thus, a requesting computer is provided with randomly selected IP addresses for each of the n different hostnames for the n DNS lookup requests made to the DNSID.com name server 604.

FIG. 8C illustrates steps that may be performed by server(s) 610. In step 870, the server(s) 610 receive n (e.g., 32) web page access requests from a user device (e.g., 110). Each of the n (32) web page access requests are directed to a host computer identified by the IP address obtained by the user device in either step 730 or 750, which is one of m (here one of 4) IP addresses, having been randomly selected in step 840. In response to each web page access request, server(s) 610 provide a response to the user device (e.g., 110) that allows the user device to identify the IP address implemented by the web page access request corresponding to the response. For example, the n responses may be predetermined and unique to the IP address identifying the host computer. For example, the responses may comprise a code unique to the IP address identifying host computer of the web page access request (e.g., one of the unique codes associated in step 810). For example, if server(s) 610 comprise four servers 610*a*, 610*b*, 610*c* and 610*d*, each server may provide the same predetermined response to the user device (e.g., mobile device 110) in response to a web page access request identifying such server as the host computer. For example, servers 610*a*, 610*b*, 610*c* and 610*d* provide a response to the user device (110) of "A" "B" "C" and "D" respectively for each web page access request of the n web page access requests directed to such server. Such responses of "A" "B" "C" and "D" may also be provided when server(s) 610 is a single server associated with all of the IP addresses DNSID IP Address A, B, C and D (see FIG.

6) (or otherwise comprise a server being identified as a host computer by more than one of these IP addresses).

Referring back to step 770 of FIG. 7, the user device (110) having received responses for each of the n web page access requests, may assemble the DNSID code. For example, each of the n web page access requests (and their corresponding unique hostname) may correspond to a different code element of the DNSID code format 800 of FIG. 8D. The responses received by the user device in response to the n web page access requests may each identify a code value to be assigned to the corresponding code element associated with the web page access request. For example, hostname "bitgroup1.DNSID.com" may correspond to code element 800-1 in FIG. 8D. Obtaining a response of "D" in response to a web access request of the user device based on the URL "http://bitgroup1.DNSID.com" may result in code element 800-1 being assigned a code value of "D" (as in FIG. 8E) or alternatively, the response of "D" may be used to identify the binary numerical value of "11" and be assigned to code element 800-1 (as in FIG. 8F).

In step 860, a DNSID of the user device may optionally be stored in database 608 (e.g., a lookup table) by the DNSID.com server. Database 608 may be part of the DNSID.com name server, or may be the same as database 144 of identity server 140 or a database that is part of server(s) 610 (where the DNSID is transmitted by the DNSID.com name server for such storage). The DNSID may correspond to the randomly selected IP addresses of the n hostnames. In particular, each of the n elements of the DNSID code format (associated a corresponding one of the n hostnames in step 820) may be provided with the unique code associated with the IP address (associated in in step 810) that was randomly selected in step 840.

In an alternative implementation, the DNSID of the user device need not correspond to a random selection, and more particularly, need not correspond to a random selection of IP addresses for each of the n DNS lookup requests in step 840 in FIG. 8B. For example, a DNSID may be selected from a group of unassigned DNSIDs where the code elements of such a DNSID may correspond to and be used in step 840 to determine the IP address of the hostname associated with such a code element (as associated in step 820). The DNSIDs assigned to user devices that are stored in database 608 may be used to determine the unassigned DNSIDs that are available to be selected for new user devices as part of implementing the method of FIG. 8B.

The following provides an exemplary implementation of the methods of FIGS. 7 and 8B in the context of the exemplary URLs, hostnames, unique codes and IP addresses discussed herein. In this example, in step 710 web browser 116-1 is provided a script to access 32 web pages identified by 32 URLs:
http://bitgroup1.DNSID.com,
http://bitgroup2.DNSID.com,
http://bitgroup3.DNSID.com,
. . .
http://bitgroup32.DNSID.com
http://bitgroup32.DNSID.com.
The 32 URLs have different hostnames:
bitgroup1.DNSID.com,
bitgroup2.DNSID.com,
bitgroup3.DNSID.com,
. . .
bitgroup31.DNSID.com, and
bitgroup32.DNSID.com.

In this example, in step 720, it is determined that the hostnames of the 32 URLs are not associated with any IP addresses in the DNS cache 118b of the DNS resolver 118a and thus the DNS resolver 118a sends 32 DNS lookup requests to DNSID.com name server 604 in step 730 (received individually in step 830 by DNSID.com name server 604).

In performing step 840 for each of the 32 received DNS lookup requests, one of the four IP addresses DNSID IP Address A, DNSID IP Address B, DNSID IP Address C and DNSID IP Address D is randomly assigned to each of the 32 hostnames. For example:
bitgroup1.DNSID.com is randomly assigned DNSID IP Address D,
bitgroup2.DNSID.com is randomly assigned DNSID IP Address A,
bitgroup3.DNSID.com is randomly assigned DNSID IP Address A,
bitgroup31.DNSID.com is randomly assigned DNSID IP Address C, and
bitgroup32.DNSID.com. is randomly assigned DNSID IP Address B.

In step 850, such randomly assigned DNSID IP addresses are transmitted by the DNSID.com name server 604 to the user device (e.g., mobile device 110) and obtained by the DNS resolver 118a (step 730) and used to update DNS cache of the user device (mobile device 110) accordingly in step 740.

In step 860, the DNSID.com name server 604 may optionally store a DNSID of the mobile device 110 that performed the 32 DNSID lookup requests, such as storing the DNSID in database 608 (which may be the same as database 144 of identity server 140 in FIG. 1). The DNSID of the mobile device 110 may comprise 32 code elements arranged according to the predetermined DSNID code format (e.g., 800 in FIG. 8D), each code element having a code value corresponding to the DNSID IP address randomly assigned to the hostname associated with that code element. More particularly, each code element is assigned a code value corresponding to the unique code assigned to the DNSID IP address (e.g., "A" "B" "C" or "D" in step 810) of the DNSID IP address that was randomly assigned to the hostname (step 840) associated with that code element. FIG. 8E illustrates an example DNSID code comprising 32 code elements (one of A, B, C or D) resulting from this particular example that may be stored and associated with mobile device 110, such as by DNSID.com name server 604. FIG. 8F illustrates a numerical value (binary number) corresponding to the DNSID code of FIG. 8E, where each of A, B, C and D are assigned a corresponding two bit binary value of 00, 01, 10 and 11 respectively.

As discussed with respect to FIG. 7, the DNSID having been assembled in step 770 by the web browser 116 may be provided in step 780 to identity server 140 in step 780. In step 790, the DNSID may be stored in a manner associated with other information obtained from the requesting computer as part of the requesting computer's request to access the n web pages. For example, an IFA and/or DID may be obtained as described herein, such as with respect to FIG. 2A. For example, when the accessing computer (accessing the n web pages/n web resources as described in FIG. 7) is performing access via a web browser, such as 116-1 or 116-2 (referred herein as an accessing browser), the IFA and/or DID may be obtained as a code stored in a cache of the accessing browser, such as a cookie or in the accessing browser's LocalStorage (e.g., as described with respect to step 220). For example, the DID may be obtained by analyzing an accessing browser's HSTS cache, such as by having the accessing browser perform a series of webpage accesses as described in step 210. Such actions by an accessing web browser may be caused by script downloaded from the web page responsible for instructing the web browser to access the n web pages in step 710, configuring the accessing computer accordingly. When the n web pages of an accessing computer are being accessed by an application that is not a web browser (such as 114), the IFA of the accessing computer may be obtained by including script (e.g., as part of the SDK 115) to instruct the application to send its IFA as part of the n web page access in step 760 (either to server(s) 610 or to some other web server, such as identity server 140).

FIGS. 2E and 2F respectively illustrate an exemplary ad tracking table 154a' and look-up table 144a' that may be implemented as a result of the systems FIGS. 6-8 when used in conjunction with the systems of FIGS. 1-5, e.g. FIG. 2F illustrates an example of a look-up table 144a' which may be generated and maintained the same manner as described with respect to FIG. 144a of FIG. 2C, with the following additional features. In this example, the look-up table 144a includes additional fields in an entry (row) of the look-up table 144a' for additional Device DID entries and a DNSID entry. Here two columns are provided for two DIDs (DID-a and DID-b) but additional DID columns may be provided (e.g., for each browser of an accessing computer). As the system may not be able to distinguish between browser types, DID-a may correspond to one of DID-1 117-1 and DID-2 117-2 of web browsers 116-1 116-2 and DID-b may correspond to the other (e.g., the look-up table 114a' may simply populate the first column based on the first browser access in initially generating a DID for the accessing computer).

The look-up table 144a' entry associated with device IFA 44FE represents an accessing computer that has generated two distinct DID codes by different web browsers 116 of that computer. As the DNSID is maintained by the DNS resolver 118a (via hostname caching in the DNS cache 118b) that is shared between the multiple browsers 116 of this accessing computer, the system has been able to correlate two distinct DIDs as being associated with the same accessing computer by identifying that each durable ID DID is associated with the same DNSID. Thus, different web accesses by different web browsers of this accessing computer may be identified as being the same user device (here, associated with IFA 44FE).

The look-up table 144a' entry associated with device IFA 8372 represents an accessing computer that has generated the same DID code by different web browsers 116 of that computer. This may be achieved by generating a DID and a DNSID by a first browser of the accessing computer as described herein which may be stored in the look-up table 144a' per step 860' of FIG. 8C. For example, an entry in look-up table 144a' may be created storing just D4BC in column "Device DID-a" and value 3232 in "DNSID column" with an opt-out flag of "0" (indicating no opt-out). Later, when a second browser of this accessing computer is instructed to access the n web pages identified by n hostnames per step 710 of FIG. 7, the system may identify the accessing computer by the previously generated DNSID value 1982 in the look-up table 144a' and instruct storage of a DID with value 1982 in this second browser (e.g., directly in a cache, such as a cookie or in LocalStorage or in the HSTS cache as described herein). The look-up table 144a' may thus be updated appropriately to add DID D4BC if desired (although this may be unnecessary as the Device DID-a column may be sufficient to correlate the accessing computer to an IFA and/or DNSID). At some point during this process, the IFA of the accessing computer may be determined (in this example, value 8372) and added to the appropriate field of the entry in the look-up table 144a'.

The entry associated with DNSID 0682 may correspond to a situation where DIDs are generated for two different browsers of the same accessing computer (identified by the same DNSID of that accessing computer) prior to determining an IFA of that accessing computer. As discussed herein, the look-up table may have its information "backfilled" including later identification of the IFA of a computer identified by its web browser accesses.

The DNS cache 118b of an accessing device may be altered to delete a previously generated DNSID. In this event, later instructions to the same computer (e.g. mobile device 110) may require this computer to perform steps 730 and 740 of FIG. 7 again (performing DNS lookups for the hostnames of the n websites—step 730— and updating the DNS cache 118b to identify the newly generated DNSID resulting from step 730—step 740). In this instance, when this computer is later identified by its IFA and/or DID (as described herein), any conflicting DNSID stored in look-up table 144a' may be discarded (e.g., overwritten) in favor of the new DNSID, or have the older DNSID be otherwise subordinate to the new DNSID in identifying an accessing computer as described herein.

FIG. 2E illustrates an example an ad tracking table 154a' which may be generated and maintained the same manner as described with respect to 154a of FIG. 2B, with the following additional features. Ad tracking table 154a' illustrates multiple columns to associate more than one DID and/or a DNSID to the same computer 120 (e.g., mobile device 110). In this example, the ad tracking table 154a of FIG. 2B is modified to include plural durable ID DID fields (DID-a and DID-b) and a DNSID field in an entry of the ad tracking table 154a'. Any identified DID, IFA and DNSID may be associated with each other as described herein, to be used to identify that different types of accesses (from different web browsers, different non web browser applications) are from the same computer, which may be used for ad calls, ad tracking fraud detection, etc. as described herein As described herein, the ad tracking table may have information "backfilled" into each entry, such that after an entry (row) is created and partially populated, later device information determined from later accesses of the same computer 120 (e.g., same mobile device 110), may be added to that entry at that later time. Ad tracking table 154a' may be hosted by an ad exchange server, such as ad server 150 and may be used as a synch table, such as a cookie synching table (which may include additional information) that correlates cookies (or similar identifying information in LocalStorage) of the ad exchange server (e.g., 150) and cookies (or similar identifying information in LocalStorage) of advertisers that respond to and win bids of the ad exchange server (e.g., 150) that results in an advertisement being displayed on the user device. As will be appreciated, use of a DNSID as described herein may be used by the ad exchange server to identify that different user ids (e.g., created by the ad exchange server that may be provided as cookies (or similar identifying information in LocalStorage) stored in different browsers of the user device) correspond to the same user device (e.g., same mobile device 110). Such correlation of different user ID's by the DNSID as described herein may also be used to correlate user ids created by advertisers with the ad exchange server ids in a similar manner.

Figure 3F:
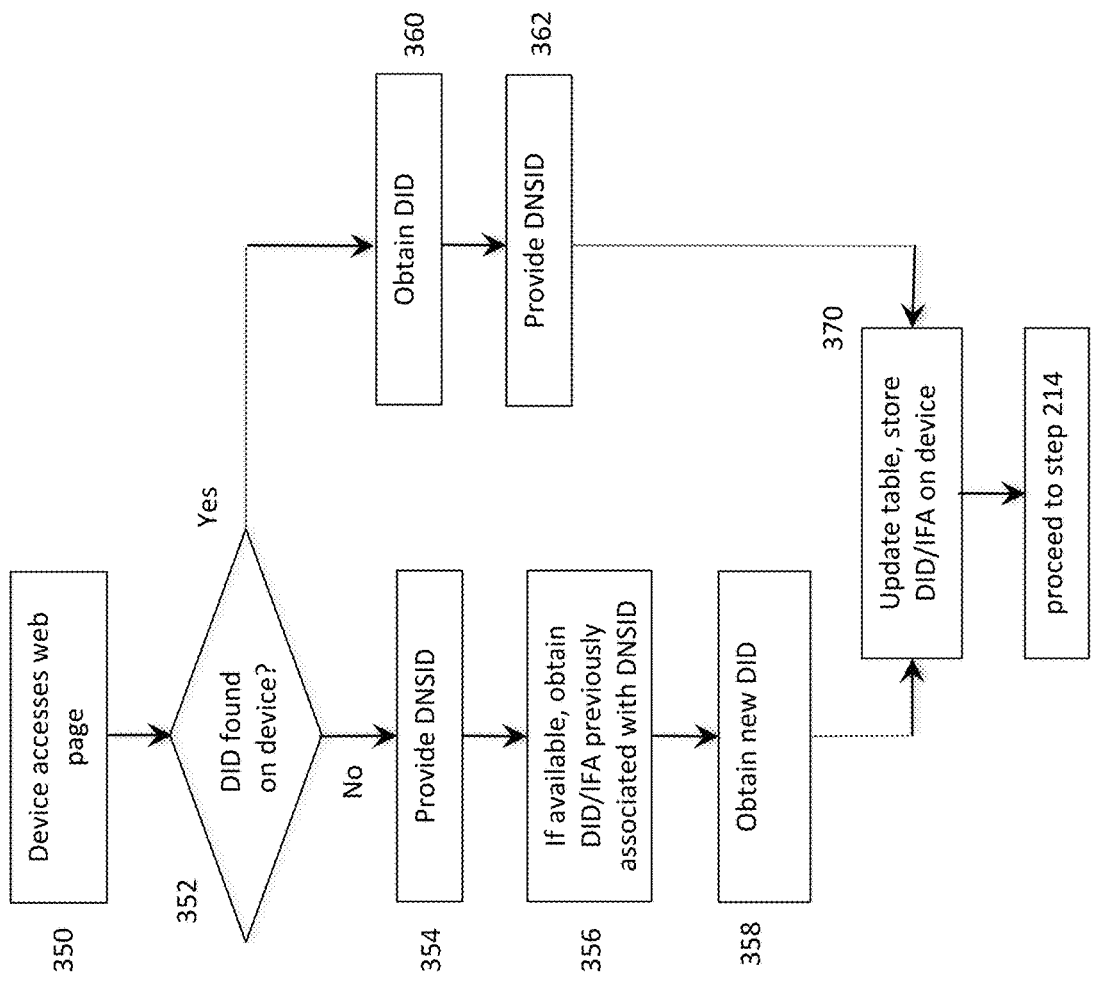

FIG. 3F illustrates an exemplary method that may be performed in conjunction with FIGS. 2A and 2D. As will be apparent, FIG. 3F may represent an exemplary implementation of the method of FIG. 3A as part of an initial generation of a DID (e.g., as part of step 202) as well as provide exemplary steps in performing later steps of FIGS. 2A and 2D.

In step 350, mobile device 110 access a web page via an accessing browser. In this example, for ease of description, the accessing browser will be exemplary selected as browser 116-1 (i.e., of FIG. 6) and the web page is exemplary selected as web page 132 of web server 130. The accessing browser 116-1 obtains script 132a (e.g., of an HTML document) and executes the same. Other browsers of the mobile device 110 (e.g., browser 116-2 of FIG. 6), even if actively running on the mobile device 110, may not be able to share information with either the web server 130 hosting web page 132 or with the accessing browser 116-1. Thus, if a DID (e.g., DID-2) has been previously stored in a cache of the browser 116-2, such DID-2 may not be obtained (e.g., read from) from browser 116-2 from either browser 116-1 or web server 130 (at least based on this access of browser 116-1 to web page 132).

In step 352, as part of executing script 132a, the accessing browser 116-1 is analyzed to determine if any DID 117 is stored in a cache of the browser 116-1, such as a DID stored in a cookie, in LocalStorage and/or in its HSTS cache of the browser 116-1. For example, a server, such as web server 130 or identity server 140 may request and analyze information from the caches of browser 116-1 to determine if a DID code 117 is stored as a cookie and/or in Local Storage, and if no DID code 117 is found, the method of FIG. 3E may be executed to determine the existence of a DID code 117 stored within the HSTS cache of browser 116-1 (and obtain the DID code 117 if present in the HSTS cache of browser 116-1).

If a DID 117 is detected in step 352 (e.g., DID-2), the method of FIG. 3F proceeds to step 360. If no DID 117 is detected in step 352, the process continues optionally to steps 354, 356 and 358, where steps 354 and 356 may optionally be performed, and may be performed prior to step 358 or, in certain implementations, simultaneously with or after step 358. In step 354, a DNSID is obtained and provided to identity server 140. The DNSID may be obtained as described herein with respect to FIGS. 6, 7 and 8A-8F or an alternative implementation (e.g., as described with respect to FIG. 8G). It will be appreciated that the obtained DNSID may be a newly generated DNSID or may have been previously generated and stored within (and configure) a DNS cache, such as stored within the DNS cache 118b of the OS 112 (or stored in a DNS cache not located outside the mobile device 110).

In step 356, it is determined whether the DNSID thus obtained is associated with a DID 117 or IFA 113. For example, identity server 140 may search for the DNSID obtained in step 354 in a lookup table 144a' in its database 144, such as described with respect to FIG. 2F. It will be appreciated that the mobile device 110 may have a DID 117 stored therein that may not be obtained from the mobile device 110 during this process (at least in response to access of this web page with the accessing browser 116-1). For example, the mobile device 110 may have DID-2 stored in a cache of a browser (e.g., 116-2) that is different from the accessing browser 116-1 that accesses the web page in step 350. Thus, performing a search of lookup table 144a' may allow the identity server 140 to obtain a DID already stored in and/or associated with the mobile device 110 and transmit the same to the mobile device 110 in step 356. Similarly, as noted herein, an IFA 113 of the mobile device 110 may not be available to the accessing browser 116-1 and web resources with which the accessing browser 116-1 may communicate (e.g., web server 130 and identity server 140). Thus, performing a search of lookup table 144a' may allow the identity server 140 to obtain a IFA 113 already stored in and/or associated with the mobile device 110 and transmit the same to the mobile device 110 in step 356. Both or only one of an IFA 113 and DID 117 may be obtained in step 356.

In step 358, a new DID code is obtained (e.g., DID-1) for storage in one or more caches of the accessing browser 116-1. The new DID code may be obtained as described with respect to step 306 in FIG. 3A, with identity server 140 selecting a previously unassigned DID code to the mobile device 110. Alternatively, step 358 may be skipped in implementations where a DID is obtained in step 356 (e.g., DID-2 as referenced herein), where the DID-2 code may be used for storage in one or more caches of the accessing browser 116-2.

In step 370, lookup table (e.g., 144a or 144a') is updated, a DID is stored in one or more caches of the accessing browser 116-1, and an IFA may be stored in one or more caches of the accessing browser 116-1, as appropriate. The DID 117 may be stored as described with respect to FIG. 3C in a cache of the accessing browser 116-1, such as in the HSTS cache of the mobile device 110 or as otherwise described herein. The DID 117 may also be stored (duplicatively or alternatively) in other caches of the accessing browser 116-1 of the mobile device 110, such as in a cookie or in the LocalStorage of the accessing browser 116-1. When steps 354 and 356 are not implemented, the DID 117 stored in step 358 may be a new DID code 117 that has not been previously assigned to a user device. In addition, if steps 354 and 356 are implemented, it may be preferable in certain implementations to store such a new DID code 117 even when a DID code (e.g., DID-2 in browser 116-2) is found in step 356 to have been previously associated with the mobile device 110. However, as noted, assigning a new DID code 117 in step 358 is not necessary, and the same DID code 117 obtained in step 356 (e.g., DID-2) may be written into accessing browser 116-1 of the accessing mobile device 110. Lookup table 144a' of FIG. 2F illustrates both cases, where an entry associated with DNSID 0682 has two different DIDs associated therewith in the same entry, while an entry associated with DNSID 1982 has the same DID code associated with this DNSID.

In step 370, an IFA may also be stored in one or more caches of accessing browser 116-1 (e.g., as a cookie or in LocalStorage of accessing browser 116-1), if an IFA is found to be associated with DNSID in step 356.

Step 370 also comprises updating lookup table (e.g., 144a' or 144a) of the identity server 140 to provide any new association of the DID and DNSID codes determined in steps 354, 356 and 358, along with any IFA obtained in step 356. In addition, even when the lookup table 144a', 144a previously included an entry with this association, (e.g., with DID-2 code and the DNSID code provided in step 354, and possibly an IFA), a duplicative entry may be desirable with a date and time of access for subsequent analysis.

Referring back to step 352, when a DID is determined to exist on the mobile device 110, the method of FIG. 3F proceeds to step 360 where the DID is obtained (here, DID-1). It should be appreciated that DID-1 may obtained as part of step 352—that is, determining whether a DID is found on a mobile device 110 may include obtaining information including DID-1 of the accessing browser 116-1, and then determining that such information represents a DID. Similarly, a request for a DID may be performed in step 360 and upon receiving a valid response to this request, it may be determined in step 352 that a DID has been found on the mobile device 110.

In step 362, a DNSID may be provided. The DNSID may be obtained as described herein with respect to FIGS. 6, 7 and 8A-8F or an alternative implementation (e.g., as described with respect to FIG. 8G). Step 362 may be same as step 354 and may be performed independent of the determination made in step 352. Thus, although FIG. 3F illustrates two distinct steps 354 and 362 to provide a DNSID, it will be appreciated that only one of these steps 354 and 362 will be performed in any one pass of implementing the method of FIG. 3F. Thus, a DNSID may be provided before and/or concurrently with step 352 as well as before and/or concurrently with step 360 (when implemented as a discrete step from 352).

In step 370, lookup table 144a' is updated to associate the DNSID with the DID obtained in step 360 (here DID-1). This step 370 may be skipped in this instance when an entry in the lookup table 144a' is determined to exist that already properly associates the DNSID obtained in step 362 with the DID-1 obtained in step 360. However, it may be preferable to include a new entry that contains such duplicative association of the DID-1 and the DNSID, with each entry including a time and date entry to distinguish the entries. This may simplify the process of FIG. 3F by avoiding the need to search the lookup table 144a' to determine if the table 144a' should be updated or not as well as providing more specific access information for various analyses.

After step 370 is performed, the process may proceed to step 214 of FIG. 2A/FIG. 2D, where an IFA is obtained if associated with any DID previously obtained (i.e., DID-1 if obtained in step 360 or DID-2 if obtained in step 356). The process may continue to proceed to subsequent steps that are performed using the DID and/or IFA, such as providing an advertisement (step 216), tracking an advertisement (step 218), and/or fraud detection.

As will be apparent, FIG. 3F may represent one implementation of the initial generation of a DID 117, and thus may represent an exemplary implementation of step 202 and step 306 described herein (whether use of a DNSID and steps 354 and 356 are implemented or not). When FIG. 3F is performed as part of the initial generation of a DID 117 for a mobile device 110 as part of step 202, after step 370, the process may proceed to step 204 (in connection with actions associated with a subsequent access of a web page by the mobile device). It should be appreciated that prior to proceeding to step 204 from step 202, additional steps may be performed, such as those described with respect to steps 214, 216 and 218 of FIG. 2A. When the method of FIG. 3F is performed after initially generating a DID 117 for a mobile device 110, step 350 may be the same as step 204 in FIG. 2A/FIG. 2D, the remaining steps of FIG. 3F may be performed as part of the process after step 204 and prior to step 216 in FIGS. 2A/2D. For example, step 352 may be performed by step 207 and step 210: when no DID code 117 is found as a cookie or in LocalStorage in 207 and finding no DID code 117 in step 210 (or finding that no completion bit of the DID 117 has been set in step 210), step 352 may result in no DID being detected on the device and proceed to steps 354-358 and 370 (or, alternatively, only steps 358 and 370) and then steps 214-218 as appropriate; conversely, when a DID 117 is obtained (e.g., steps 207 and 220 or step 210), step 352 would result in detecting a DID on the device (in such a case, the process proceeding to the appropriate subsequent steps as described with respect to FIG. 2A/FIG. 2D).

Referring again to FIGS. 1 and 6, providing a DNSID as described above has been made with reference to a DNS resolver 118a and DNS cache 118b provided as part of a user device (in the example, a DNS resolver 118a and DNS cache 118b of mobile device 110). However, a DNS resolver and DNS cache may be implemented outside of a user device and may be shared by several user devices. For example, a DNS resolver/DNS cache may be implemented in a connection between a local area network and the network, such as within a wireless router that configures local area network 192 (see FIG. 1). The local area network 192 might correspond to a local area network of a house or of a large business. Similarly, an internet service provider may provide a DNS resolver/DNS cache to communicate with user devices attempting to determine IP addresses associated with a hostname. For example, cell phone network 190 might provide a DNS resolver/DNS cache to communicate with multiple mobile devices 110 that are part of the cell phone network 190.

Thus, in certain instances, when a DNS resolver 118a on a user device (e.g., 110) determines that its DNS cache 118b does not include the IP address of a hostname (attempting to be accessed by a browser 116 of the device), a DNS lookup request may be issued by the user device as described herein. However, rather than having such a DNS lookup request eventually be directed to the corresponding DNS name server to obtain the appropriate IP address (such as DNSID. com name server 604), a DNS resolver located outside the user device (e.g., as referenced above) may receive such a DNS lookup request and provide a corresponding IP address located in its DNS cache corresponding to the hostname of the request.

As will be appreciated, such off-device DNS resolver actions may be repeated for the same DNS requests received from different user devices. More particularly, in performing step 730 in FIG. 7, in response to the DNS lookup requests for each of the hostnames (e.g., the n hostnames discussed with respect to step 710), rather than receiving IP addresses selected by DNSID.com name server 604 (as described with respect to FIG. 8B), the IP addresses will be those stored in the off-device DNS cache of the off-device DNS resolver.

Thus, multiple user devices being networked to such an off-device DNS resolver and its DNS cache will receive the same IP addresses for the n hostnames and thus receive the same code elements for the n responses received in step 770 and thus assemble and provide identity server the same DNSID in steps 770 and 780 (referred to herein as a shared DNSID).

Further exemplary implementations of the system of FIG. 6 and the described related methods comprise storing such a shared DNSID in a table, such as lookup table 144a' and/or 154a' as described with respect to FIGS. 2E and 2F, e.g. By determining which shared DNSID is shared among different DIDs and/or different IFAs, certain assumptions may be made and acted upon. For instance, when a number of DIDs that share the same DNSID is less than or equal to a first threshold, such as less than or equal to 5, it may be assumed that the DNSID is not shared between multiple user devices, but rather represents different web browser applications 116 of the same user device having different DIDs assigned and stored therein. Thus, no deviation of the methods described above need be taken, and the DNSID may be used to correlate different DIDs, IFAs and advertisements to a single user device.

When a number of DIDs that share the same DNSID is greater than the first threshold, but less than or equal to a second threshold, such as less than or equal to 15, or less than or equal to 30 or less than or equal to 50, it may be assumed that the DNSID is a shared DNSID between multiple user devices and that users of such multiple user devices are likely located close to one another and thus have a certain relationship. Primarily, it may be initially assumed that such multiple users represent users of the same household or family. In such an instance, the use of a network router having an off-device DNS resolver and DNS cache in a house could be assumed to cause the generation of a shared DNSID to a small amount of user devices.

Similarly, when a number of DIDs that share the same DNSID is greater than the second threshold (e.g., 15, 30 or 50), but less than or equal to a third threshold (e.g., 40, 100, 200, 1000) other assumptions may be made, such as the relationship of the users may stem from working at the same small business (having the off-device DNS resolver and DNS cache in a firewall device and/or router of the small business).

A larger number of DIDs sharing the same DNSID above the third threshold but lower than a fourth threshold, may indicate users working at a larger business or students of the same college/university, e.g. A very large number of users sharing the same DNSID (e.g., above the fourth threshold) may indicate the DNS resolver and DNS cache are provided by an internet service provider.

Additional criteria may be used to make various assumptions about the possible users of the user devices associated with the same DNSID. For example, time of accessing server(s) 610 may show relatively intense access during standard working hours (e.g., between 8 AM and 6 PM, with even more intense access during normal lunch hours (e.g., 11 AM to 2 PM), with relatively little access outside normal working hours. Such data may thus indicate the DNS resolver and DNS cache associated with the shared DSNID is likely related to a local area network of a business. Similarly, activity analysis showing evening usage may indicate the DNS resolver and DNS cache associated with the shared DSNID are likely associated with a household (when the number of DIDs sharing the DSNID is relatively small, such as less than the second threshold) or likely associated with a college or university (when the number of DIDs sharing a DSNID is relatively large, such as between the third and fourth threshold, as discussed above).

Based on such analysis, certain additional actions may be performed. For instance, when it is determined that a DNSID is likely a shared DNSID, DIDs associated with the shared DNSID will not be treated as being associated with the same user device, as described elsewhere herein. As such, any IFA found associated with one of these DIDs may not be considered to be also belong to the remaining DIDs with a corresponding update of tables 154*a*' and 144*a*', as might otherwise happen. Identifying smaller groups of related users, such as a household, might be used to analyze the browsing habits and advertisement views (and advertisement selection (e.g., clicks)) by the smaller group to determine what advertisements might be more interesting and relevant to this smaller group. Similarly, assumptions of the user device being part of a business or college/university may be used to determine more appropriate advertisements to deliver, such as advertisements targeting related age groups of college students and/or targeting typical purchases made by business users or students.

In addition, after identifying such groups of user devices (and users) based on a shared DNSID, ad views and ad clicks of each of these groups may be separately analyzed to determine what ads of more interest to the group, and/or what products and/or services appear to be purchased by the group, to provide advertisement information relating to the same. For instance, it may be determined that a particular group has significant interest in music and photography which may be helpful to provide ads for digital cameras and/or wireless speakers, e.g.

Figure 2G:
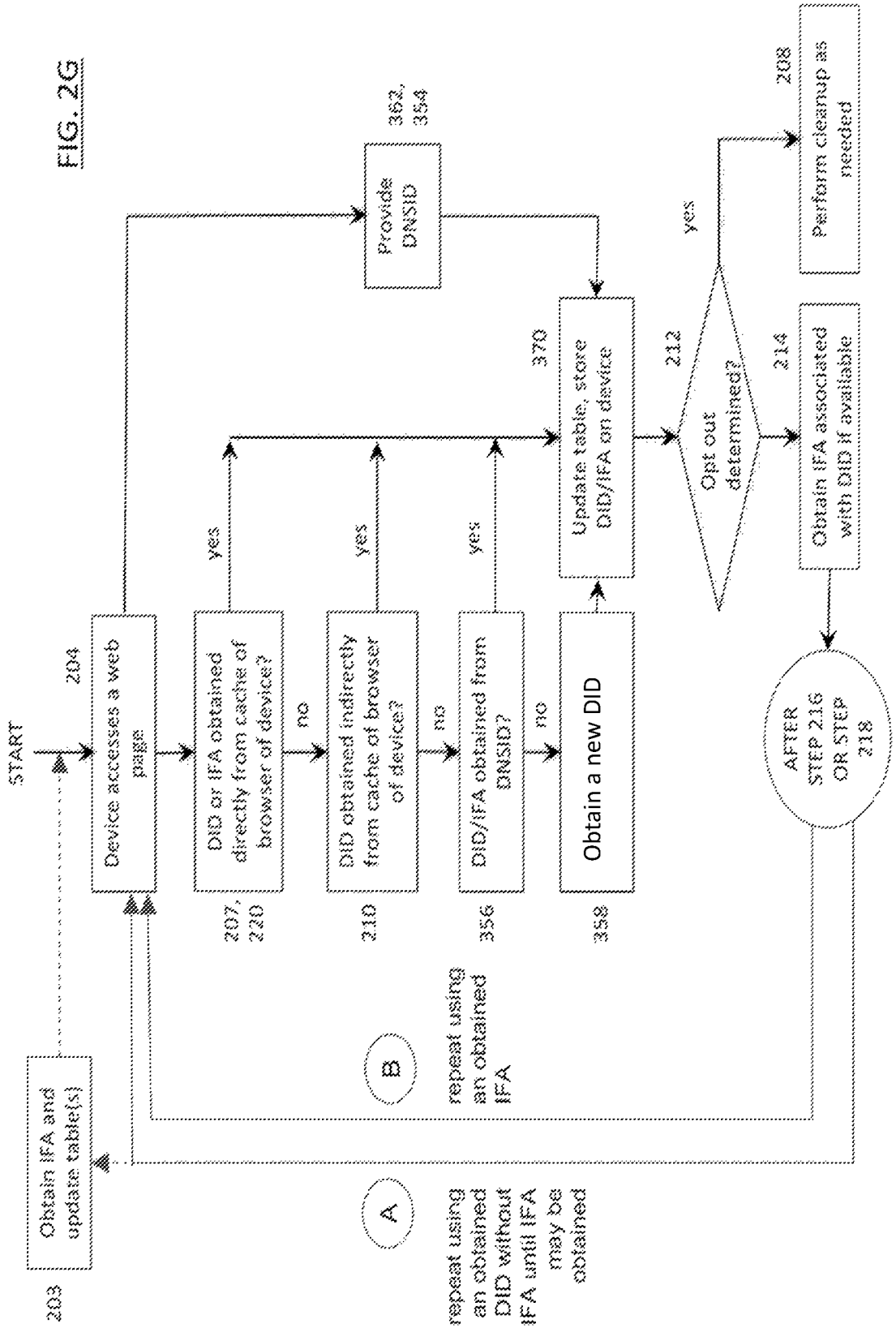

FIG. 2G illustrates an additional example of implementing the method of FIGS. 2A/2D with the method of FIG. 3F. In this example, the DID 117 of a mobile device 110 may be initially generated as part of the method of FIG. 2G (e.g. representing step 202) or the DID 117 may have been previously generated prior to performing the method of FIG. 2G (such as by a previous implementation of the process of FIG. 2G). As the steps of FIG. 2G have been described herein, repetitive description here is avoided. It should be appreciated that for clarity of description, the description of FIG. 2A separated the initial generation of a DID (step 202) from the remainder of the method steps of FIG. 2A for ease of description regarding use of a DID stored on a user device (e.g., mobile device 110). The method of FIG. 2G may be executed without obtaining a DID and result in generating and storing a DID (steps 358, 370). In addition, it should be appreciated that obtaining an IFA and/or DID directly from a cache of the accessing browser (e.g., IFA/DID cookie or Local Storage in step 220), obtaining the DID indirectly from the accessing browser (e.g., from the HSTS cache of the accessing browser, such as step 210) and obtaining a DID by performing a lookup of look-up table 144*a*' (e.g., step 356) may only be performed if such information is available to be obtained. Thus, the process flows associated with a "yes" in FIG. 2G indicates performing step 220, 210 or 356 (as appropriate) to successfully obtain a DID (as well as possibly an IFA) in accordance with the description set forth elsewhere herein, while the process flow associated with a "no" indicates these steps 220, 210 and 356 (as appropriate) were not performed (e.g., skipped) or were initiated but did not result in successfully obtaining a DID or IFA (as appropriate). It should also be appreciated that only one opt-out determination is shown being made in FIG. 2G, however performing an opt-out analysis of step 212 may be performed at various stages of the method as desired (e.g., as described with respect to FIG. 2A).

FIG. 8G illustrates an exemplary method that may be performed by server(s) 610 in conjunction with the steps performed by a user device, such as mobile device 110, in connection with the methods of FIGS. 7, 8A and 8B and may be implemented with the system of FIG. 6. More specifically, the method of FIG. 8G may be performed by server(s) 610 to assemble a DNSID of a requesting user device (as described herein with respect to mobile device 110) by server(s) 610 rather than assembling the DNSID by the accessing user device (as described with respect to steps 770 and 780 of FIG. 7). It should also be apparent that the method of FIG. 8G may be performed in addition to the method of FIG. 8C and the assembling of the DNSID by the accessing user device as described with respect to steps 770 and 780.

In step, 870, the one or more server(s) 610 receive n web page access requests associated with n URLs from a user device, such as mobile device 110 (which will continue to be referenced herein as an exemplary user device). As noted herein, these n access requests may be requests for other web resources that need not be web pages (web pages will be continued to be referenced for ease of explanation). Such n web page access requests may be performed in accordance with step 760 of FIG. 7. IP addresses of the n hostnames of the n URLs may be obtained be performing DNS lookups as described with respect to step 730 of FIG. 7 and the method of FIG. 8B. Alternatively, the IP addresses of the n hostnames of the n URLs may be obtained from the DNS cache of the requesting computer (such as from DNS cache 118b of OS 12 of mobile device 110) as described with respect to step 750 of FIG. 7. As noted herein, the IP addresses of the n hostnames of the n URLs may be obtained from the DNS cache when the requesting computer (e.g., mobile device 110) has previously obtained the IP addresses of the n hostnames in step 730 (in accordance with the method of FIG. 8B) during a previous access of the n web pages by the requesting computer.

In step 880, for each of the n web page accesses, the server(s) 610 determines the hostname associated with the web page access and pairs (associates) the hostname with the IP address that the web page access request uses to identify the host computer. The hostname associated with each of the web page access requests may be provided with the corresponding web page access request from the mobile device 110, or may determined by other information provided with the web page access request, such as path information provided by the web page access request (where such path information is previously selected to be unique to just one of the n hostnames. By providing unique path information for each of the URLs of the n web page requests, the path information received by the host computer may be used to identify that an access request is associated with a particular web page request. As used herein, "path" (which also may be referred to as a "query string") includes any information after the slash after the hostname in a URL, including queries and fragments.

The IP address used to identify the host computer may not identify the hostname used to obtain the IP address. An IP address of a host computer of the n web page accesses may be shared between several of the n web page access requests. Recall that the IP address provided for each hostname by DNSID.com name server 604 (and thus for each web page access having a different hostname) may be randomly generated to be one of m IP addresses (here, to be one of DNSID IP Address A, B, C or D) in some examples, or may be selected based on an available (unassigned) DNSID code. This is true whether the IP address generated by the DNSID.com name server 604 in response to running a script responsible for the n web page accesses of step 870 (such as described with respect to steps 710 and 730 of FIG. 7 and FIG. 8B) or obtained earlier from a previous access of the n web pages, where the hostnames are now obtained from DNS cache 118b as part of a second, later access of the n web pages (such as described with respect to steps 710 and 750 in FIG. 7).

In some examples, each of the m IP addresses may identify a particular host computer, different from other host computers identified by the other ones of the m IP addresses. Thus, access itself to the host computer may identify the IP address of the web page access request. In other examples, a host computer may be identified by more than one of the m IP addresses. In this case, the IP address should be contained in and extracted from the web page access request to identify the IP address of each web page access request.

In step 890, the DNSID of the requesting device is determined using the n hostname/IP address pairs. As described with respect to FIGS. 8D, 8E and 8F, the DNSID may comprise a plurality of code elements. For each hostname/IP address pair, the hostname may determine a position of a code element of the DNSID (having been assigned in step 820 of FIG. 8A) and the IP address may provide the code value to that code element of the DNSID (having been assigned in step 810 of FIG. 8A). Determining the DNSID in step 890 may be performed on the server side (such as by server(s) 610 and/or identity server 140) and not require further information to be obtained from mobile device 110.

In some examples, several sets of n web page access requests may be received from different user devices, each corresponding to a different DNSID code. As each set of these n web page access requests may include the access requests associated with the same set of hostnames, server(s) 116 may receive plural access requests associated with the same hostname and need to determine which access request is associated with which user device.

Several techniques may be implemented to sort through the several sets of n web page access requests from the plural user devices. First, device fingerprinting may be implemented to distinguish one user device from another based on certain information common to each access request of one set of n web page access requests, but not found in the other sets of n web page access requests. For example, the web page access requests may be sorted based on browser version, operating system version, location, time zone, return IP address, etc. In addition, web page access requests may result in obtaining information from the cache of the user device (e.g., a cookie or information in LocalStorage), which may be used to distinguish on user device from another.

In some examples, the different sets of n web page access requests may be distinguished from each other based on the time of receipt of the web page access requests. For example, server(s) 610 may assume that any set of n web page requests provided by the same user device should all be received within 10 seconds or less, or within 5 seconds or less, or within 3 seconds or less, for example. Thus, selection of n web page access requests by server(s) 610 to determine a corresponding DNSID may be required to have been received within a predetermined time window (e.g., all n web page access requests received within a 10 second time window, or within a 5 second time window, or within a 3 second time window, e.g.).

In some examples, the DNSID may be generated with additional code information associated with the DNSID. For example, upon generation of the DNSID by the DNS server as described with respect to FIG. 8B, an error correction code (ECC) may be generated by an ECC module (circuit or software) based on conventional techniques, and used to provide IP addresses to DNS lookup requests for additional and unique hostnames from the user device associated with additional web page access requests. In the same manner that each web page access request may be used to identify a code value and code location, the ECC code may be identified by the server(s) 610 and confirm which set of n web page access requests (out of several possible sets) correctly corresponds to the ECC code (e.g., the DNSID code obtained from such confirmed set of n web page access requests may be processed to obtain an ECC code that matches the ECC code obtained from the additional web page requests. It should be recognized that code elements of the ECC code may be received by server(s) 610 that are associated with the same hostname (and thus likely provided by different user devices). However, use of ECC code as described herein may be sufficient in many instances to identify the correct group of ECC code elements (as ECC coding is also effective to correct errors in an ECC code, so too can ECC coding identify correct ECC code elements of a particular set of n web pages). Alternative to ECC coding, other codes may be selected to correspond to the DNSID upon its generation (e.g., a randomly generated confirmation code).

What is claimed is:

1. A method of accessing a web resource by a computer, comprising:
   (a) obtaining a first identifying code for advertisers (IFA) and storing the first IFA at a known location within nonvolatile memory of the computer that is inaccessible to a first web browser application installed on the computer,
   (b) by a first application installed on the computer, obtaining the first IFA from the known location and providing the first IFA to an identity server as part of a communication to the identity server that associates a first ID code with the first IFA;
   (c) by the first web browser application executing a first script, performing first accesses to a plurality of predetermined web resources that are identified in the first script, including providing n access requests (where n is an integer), each access request including a corresponding hostname that is different from the hostnames of the other access requests, each first access resulting in a corresponding domain name server (DNS) lookup query to determine a corresponding IP address for the hostname of the corresponding access request, the corresponding IP address identifying a corresponding one of the plurality of predetermined web resources, wherein responses to the DNS lookup queries resulting from the n first accesses configure a DNS cache with the first ID code as a result of the DNS cache associating the hostnames of the n access requests with corresponding ones of the IP addresses as determined from the corresponding DNS lookup query; and
   (d) by the first web browser application, providing the first ID code to obtain the first IFA from a source external to the computer, storing the first IFA in a cache of the first web browser application, initiating a first ad call associated with the first IFA, and rendering an advertisement received in response to the first ad call,
   wherein the obtaining the first IFA from the source external to the computer includes: by the first web browser application, accessing a first web page, downloading the first script provided by the first web page, and executing the first script to configure the DNS cache with the first ID code in accordance with step (c) and obtain the first IFA in accordance with step (d).

2. The method of claim 1,
   wherein by the first web browser application, the first ID code is stored in a cache of the first web browser application, and
   wherein, in step (d), the first ID code is sent to the identity server by the first web browser application to obtain the first IFA.

3. The method of claim 2, further comprising receiving a communication from the identity server that includes the first ID code and the first IFA.

4. The method of claim 1, wherein initiating the first ad call associated with the first IFA by the first web browser application comprises initiating the first ad call with a communication including the first IFA.

5. The method of claim 1,
   wherein the first IFA associated with the first ad call is associated by the web browser sending an ad request that includes the first ID code.

6. The method of claim 1,
   wherein providing the first IFA to the identity server includes providing a packet to the identity server that includes the first IFA.

7. The method of claim 1, wherein, by the first web browser application, receiving the first ID code from the identity server and storing the first ID code on the computer.

8. The method of claim 1, wherein the first IFA is unique to the computer to identify the computer.

9. The method of claim 1, wherein the known location within nonvolatile memory of the computer is identified by a predetermined logical address.

10. The method of claim 1, wherein the known location within nonvolatile memory of the computer is a predetermined register of the computer.

11. The method of claim 1,
    wherein the first IFA, at the known location within nonvolatile memory, is only accessible through a request to an operating system (OS) of the computer, and
    wherein obtaining the first IFA from the known location further comprises a request initiated by the first application to the OS of the computer.

12. The method of claim 1, wherein obtaining the first IFA from the known location comprises obtaining the first IFA via an application programming interface (API) of the OS.

13. The method of claim 1, wherein the identity server comprises a plurality of servers in communication with one another.

14. The method of claim 1, further comprising, by the first application, sending a-plural access requests to the identity server, reconstructing the first ID code from plural responses corresponding to the plural access requests to the identity server, and sending the reconstructed first ID code to the identity server.

15. The method of claim 1, wherein performing the first accesses to the plurality of predetermined web resources by the first application or by the first web browser application includes:
    for each of the n access requests, using the corresponding IP address determined from the corresponding DNS lookup query to access a corresponding one of the plurality of predetermined web resources, to thereby obtain n corresponding responses from the plurality of predetermined web resources,
    reconstructing the first ID code from the n responses, and sending the reconstructed first ID code to the identity server.

16. The method of claim 15,
    wherein the first script is obtained in response to the accessing the first web page by the first web browser application.

17. The method of claim 15, wherein reconstructing the first ID code from the n responses includes receiving a corresponding portion of a code forming the first ID code with each of the n corresponding responses and assembling the n portions to reconstruct the code forming the first ID code.

18. The method of claim 17, wherein for each portion of the code forming the first ID code, a relative location of the portion within the code is determined by the hostname of the corresponding access request associated with the corresponding response providing the portion of the code.

19. The method of claim 17, wherein at least some of the IP addresses determined from the DNS lookup queries as a result of the first accesses are the same.

20. The method of claim 19, wherein at least some of the n corresponding responses from the plurality of predetermined web resources are received from the same one of the predetermined web resources and provide a same value for the corresponding portion of the code.

21. The method of claim 1, wherein obtaining the identifying code for advertisers step further includes receiving the IFA from a server associated with a manufacturer of the computer.

22. The method of claim 1, wherein storing the first IFA in the cache of the first web browser application comprises storing the first IFA with a predetermined code that identifies the first IFA.

23. The method of claim 1, further comprising, by the first web browser application, receiving the first ID code and storing the first ID code in the cache of the first web browser application.

24. The method of claim 1, wherein the first IFA as stored in the cache of the first web browser application is encrypted.

25. The method of claim 1, further comprising:
sending an opt-out request to the identity server, and
erasing the first IFA stored in the cache of the first web browser application.

26. The method of claim 1, wherein the first application is a non-web browser application.

27. The method of claim 1, wherein the first application is an email application.

28. The method of claim 27, wherein the first application includes a standard developers kit (SDK) that is configured to obtain the first IFA by accessing an application programming interface (API) of the OS.

29. The method of claim 1, wherein the first application is one of the following applications: a game application, a music application, a news application, a social media application, a maps application, a travel application, and a health application.

30. The method of claim 29, wherein the first application includes a standard developers kit (SDK) that is configured to obtain the first IFA by accessing an application programming interface (API) of the OS.

31. The method of claim 1, wherein the computer is a mobile phone.

32. A computer-readable non-transitory medium storing a software program that, when installed on a computer, configures the computer to execute the steps of claim 1.

33. The method of claim 1, wherein at least some of the IP addresses determined from the DNS lookup queries as a result of the first accesses are the same.

34. The method of claim 1, further comprising:
after the performing of the first accesses in step (c), by one of the first application and by the first web browser application that did not perform the first accesses in step (c), performing second accesses to the plurality of predetermined web resources by providing the n access requests and using the IP addresses corresponding to the hostnames of the n access requests received from the DNS cache to access the plurality of predetermined web resources.

35. The method of claim 34, wherein performing the second accesses to the plurality of predetermined web resources includes:
for each of the n access requests of the second accesses, using the corresponding IP address stored in the DNS cache to access a corresponding one of the plurality of predetermined web resources, to thereby obtain n corresponding responses from the plurality of predetermined web resources,
reconstructing the first ID code from the n responses, and
sending the reconstructed first ID code to the identity server.

36. The method of claim 1, wherein each of the first application and the web browser are configurable with the first script to generate the first ID code upon execution of the first script by the first application or the web browser.

37. The method of claim 1,
wherein the first ID code is formed of n portions of equal bit-length, and
wherein the DNS cache comprises n entries, wherein each entry of the n entries associates a corresponding one of the hostnames of the n access requests with a corresponding one of the IP addresses that identifies a value of a corresponding portion of the first ID code.

* * * * *